US008099413B2

(12) United States Patent
Ito

(10) Patent No.: US 8,099,413 B2
(45) Date of Patent: Jan. 17, 2012

(54) RELATIVE DOCUMENT PRESENTING SYSTEM, RELATIVE DOCUMENT PRESENTING METHOD, AND COMPUTER READABLE MEDIUM

(75) Inventor: Yasuhiro Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 546 days.

(21) Appl. No.: 12/209,877

(22) Filed: Sep. 12, 2008

(65) Prior Publication Data

US 2009/0240715 A1      Sep. 24, 2009

(30) Foreign Application Priority Data

Mar. 21, 2008   (JP) ................... 2008-072841

(51) Int. Cl.
    *G06F 17/30* (2006.01)
(52) U.S. Cl. ......... 707/724; 707/737; 707/749; 715/243
(58) Field of Classification Search .............. 707/705, 707/724, 726, 728, 729, 730, 737, 749, 802, 707/821, E17.005, 999.1, 999.107, 892, 743, 707/744, 745, 746, 747; 715/200, 243, 244, 715/245, 246, 248, 253
    See application file for complete search history.

(56) References Cited

U.S. PATENT DOCUMENTS

| | | | | | |
|---|---|---|---|---|---|
| 5,790,853 | A | * | 8/1998 | Nomura et al. | 718/104 |
| 6,131,096 | A | * | 10/2000 | Ng et al. | 1/1 |
| 6,671,855 | B1 | * | 12/2003 | Hayashi et al. | 715/234 |
| 2005/0273466 | A1 | * | 12/2005 | Yoon | 707/100 |
| 2007/0186157 | A1 | * | 8/2007 | Walker et al. | 715/530 |

FOREIGN PATENT DOCUMENTS

| | | |
|---|---|---|
| JP | A-2000-67006 | 3/2000 |
| JP | A-2000-76367 | 3/2000 |
| JP | A-2005-010931 | 1/2005 |
| JP | A-2005-332080 | 12/2005 |
| JP | A-2006-350659 | 12/2006 |
| JP | A-2007-133516 | 5/2007 |

OTHER PUBLICATIONS

Hayashi, et al., "Activity Awareness: Spreading Collaboration Space among Individual Activities," *Transactions of Information Processing Society of Japan*, Nov. 1999, pp. 3977-3987, vol. 40, No. 11 (w/ English abstract).
Notification of Reason for Refusal for Japanese Application No. 2008-072841, mailed on Jan. 26, 2010 (w/ English translation).

* cited by examiner

*Primary Examiner* — Greta Robinson
(74) *Attorney, Agent, or Firm* — Oliff & Berridge, PLC

(57) ABSTRACT

A relative document presenting system includes: a first storage; a relevancy degree calculating unit; a receiving unit; a specifying unit; a totaling unit; and a presenting unit.

6 Claims, 22 Drawing Sheets

FIG. 4

| GROUP ID | ASSIGNED DOCUMENT | ATTENDANT INFORMATION |
|---|---|---|
| 001 | A | ... |
|  | H |  |
|  | I |  |
| 002 | C | ... |
|  | K |  |
|  | L |  |
|  | P |  |
| ⋮ | ⋮ | ⋮ |

FIG. 8

| TARGET DOCUMENT | WORK SPACE ID | PERIPHERAL DOCUMENT | DISTANCE |
|---|---|---|---|
| A | 1 | B | 1 |
| | | F | 2 |
| | | G | 3 |
| | 2 | B | 1 |
| | | C | 3 |
| | | F | 2 |
| | | G | 1 |
| | 3 | C | 2 |
| | | E | 2 |
| | | F | 1 |
| | ⋮ | ⋮ | ⋮ |
| B | ⋮ | ⋮ | ⋮ |
| ⋮ | ⋮ | ⋮ | ⋮ |
| H | 1 | C | 1 |
| | | D | 2 |
| | | E | 1 |
| | ⋮ | ⋮ | ⋮ |
| ⋮ | ⋮ | ⋮ | ⋮ |

FIG. 9

| DISTANCE | RELEVANCY DEGREE |
|---|---|
| 1 | 3 |
| 2 | 2 |
| 3 | 1 |
| 4 | 0 |

*FIG. 11*

| DOCUMENT ID | DISTANCE |
|---|---|
| B | 1 |
| F | 2 |
| G | 3 |

FIG. 13

| DOCUMENT ID | RELEVANCY DEGREE TOTALED VALUE |
|---|---|
| B | 10 |
| C | 11 |
| D | 2 |
| E | 4 |
| F | 5 |
| G | 4 |

FIG. 18

| USERS CORRESPONDING TO EACH WORK SPACES / USER WHO DESIGNATED TARGET DOCUMENT | HANAKO SUZUKI | JIRO SATO | ICHIRO TANAKA | ... |
|---|---|---|---|---|
| HANAKO SUZUKI | 5 | 3 | 1 | ... |
| JIRO SATO | 3 | 5 | 2 | ... |
| ICHIRO TANAKA | 1 | 2 | 5 | ... |
| ... | ... | ... | ... | ... |

FIG. 20

| WORK SPACE ID | LINE-UP FLAG |
|---|---|
| 00101 | 1 |
| 00102 | 0 |
| 00103 | 0 |
| ⋮ | ⋮ |

RELATIVE DOCUMENT PRESENTING SYSTEM, RELATIVE DOCUMENT PRESENTING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-072841 filed Mar. 21, 2008.

BACKGROUND

1. Technical Field

This invention relates to a relative document presenting system, a relative document presenting method, and a computer readable medium.

2. Related Art

Conventionally, as a system for retrieving and presenting any electronic document related to a certain electronic document, various proposals have been made. There is also a known system for providing a display which represents the degree of relation (or relevancy degree) between the electronic documents by a distance on a screen.

SUMMARY

According to an aspect of the present invention, a relative document presenting system includes: a first storage that stores an arranging position of each of electronic documents arranged in each of a plurality of workspaces; a second storage that stores a group to which each of the electronic documents belongs; a relevancy degree calculating unit that, for each of the workspaces, calculates relevancy degrees between the electronic documents on the basis of the arranging position of each of the electronic documents in the workspaces stored in the first storage; a receiving unit that receives designation of a target electronic document from a user; a specifying unit that specifies an electronic document belonging to the same group as the target document designated by the user on the basis of the second storage; a totaling unit that, for each of the electronic documents, totals relevancy degrees between each of the electronic documents and the target electronic document and relevancy degrees between each of the electronic documents and the electronic document specified by the specifying unit in each of the workspaces; and a presenting unit that presents an electronic document related to the target electronic document among the electronic documents on the basis of a totaling result obtained by the totaling unit.

BRIEF DESCRIPTION OF THE DRAWINGS

Exemplary embodiment of the present invention will be described in detail based on the following figures, wherein:

FIG. 4 is a view of an example of the data contents of a document group DB;

FIG. 8 is a view of an example of the data contents of a relative information management DB;

FIG. 9 is a view showing an example of conversion information;

FIG. 11 is an example of information on peripheral documents for the electronic document designated on a workspace;

FIG. 13 is an example of the data contents of a totaling table;

FIG. 18 is a view showing an example of the user relationship table in a third modification of the embodiment;

FIG. 20 is a view showing an example of the line-up flag information in a fourth modification of the embodiment;

DETAILED DESCRIPTION

Now referring to FIG. 1, an explanation will be given of an example of the document management system according to this embodiment. This system provides a virtual space called a workspace to a user. The workspace is typically a two-dimensional space, but not limited to it. The user arranges one or more electronic documents in the space.

In this embodiment, the concept of the "electronic document" includes data such as document data, spread sheet data, graphic data, image data, audio data and multi-media data. The concept of the "electronic document" also includes a program. The reference data (e.g. a "shortcut") indicative of these data and program are included in the "electronic document".

The electronic document arranged in the workspace is correlated with position coordinates within the workspace. In the workspace, the electronic document is displayed as a symbol image representing the pertinent electronic document. The symbol image is e.g. an icon or a reduced image of the pertinent electronic document. The icon is a graphic correlated with an application correlated with the electronic document. The symbol image of the electronic document may include identification information such as the file name of the pertinent electronic document. The workspace can be considered to be a kind of (substantive or virtual) directory or folder containing the information of the position coordinates of each electronic document. For example, where the workspace is two-dimensional, the position coordinates of the electronic document can be represented by an XY coordinate system with pixel units on a screen of the workspace.

The document management system provides one or more workspaces to individual users, respectively. The user can arrange the electronic document at desired position coordinates within his own workspace. The user can prepare the workspace for each segment determined by himself such as each business or period to store the electronic documents related to the pertinent segment in the workspace.

Figure 2:
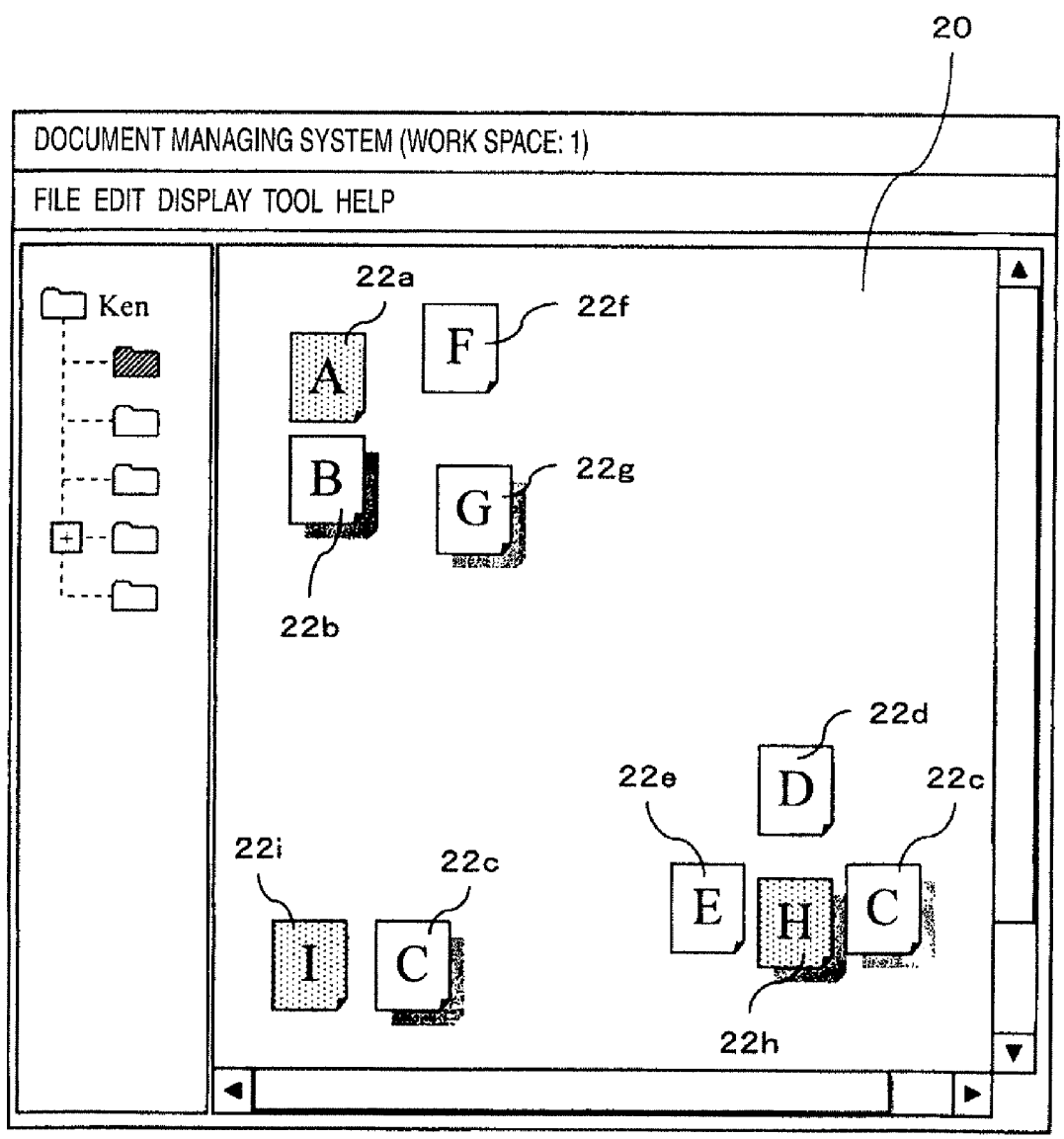
FIG. 2 is a view showing an example of a workspace screen.

The document management system creates the information of the screen representing the workspace to be provided to a user's terminal. An example of the screen of the workspace is shown in FIG. 2. FIG. 2 shows a workspace screen 20 for a certain user. As illustrated in the figure, on the workspace screen 20 arranged are symbol images 22a to 22h of the respective electronic documents included in the pertinent workspace at the position coordinates corresponding to the pertinent electronic documents, respectively. The desktop screen provided by an operating system is an example of the workspace screen. The workspace screen is based on a graphical user interface (GUI) so that the user can manipulate the electronic document indicated on the workspace screen using a pointing device such as a mouth. For example, the user can move the symbol image of the electronic document on the workspace screen by a "drug-and-drop" operation. According to this movement, the position coordinates of the electronic document changes. If the user arranges the electronic documents related to one another in the proximity of one another within the workspace, as illustrated in FIG. 2, some groups of the electronic documents may be created within the workspace. Further, by selecting the symbol image of the electronic document using an input means such as a pointing device, an opening or other operation can be done for the file of the pertinent electronic document.

Where the area of the workspace itself is larger than the area which can be actually displayed by the display device, the use cannot see the entire workspace at a time. For example, if the electronic document within the workspace is located at the place not displayed by the display device, this document cannot be seen, for example, unless the screen is not scrolled.

In this embodiment, on the basis of the information of the workspace contained in the document management system, determined is any electronic document (hereinafter referred to as a relative document) related to a target electronic document designated by the user (hereinafter referred to as a target document). The document management system determines the relative document related to the target document on the basis of the distance between the electronic documents within the workspace. In determination, in this embodiment, the users employ the information on the document group created for the purpose of document management and others. Specifically, the document management system considers not only the distance from the target document to each of other respective documents, but also the distance from any electronic document (hereinafter referred to as the same group document) belonging to the same group as the target document to each of the other respective documents.

Figure 1:
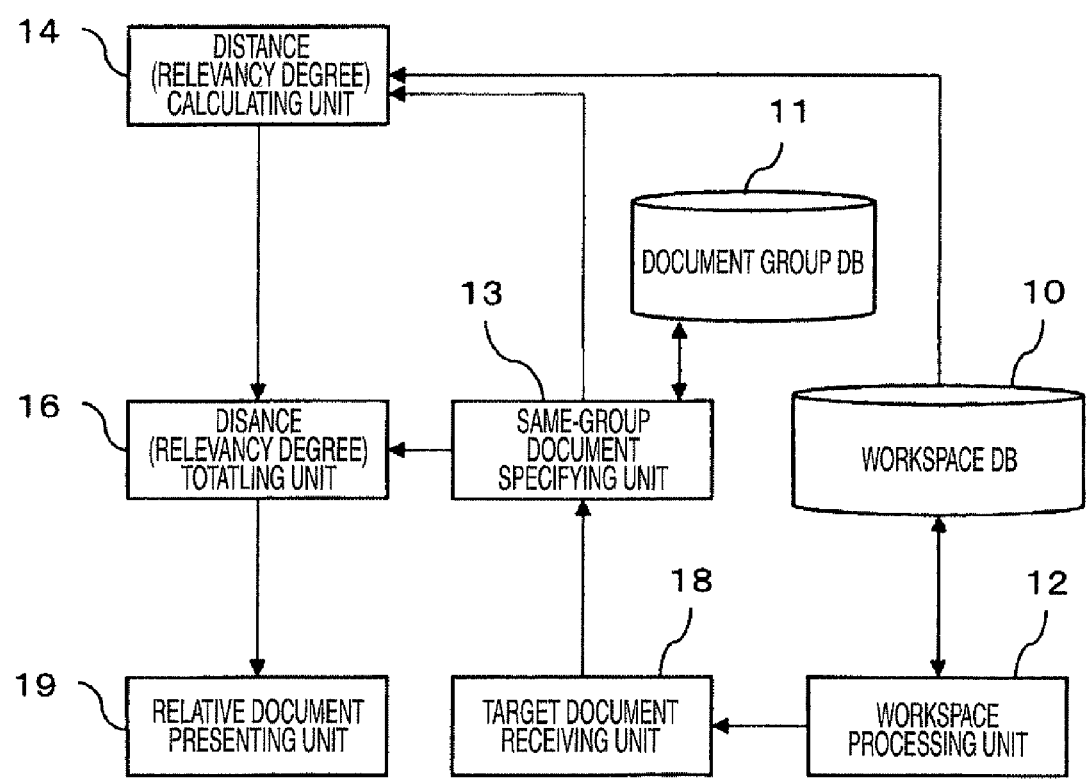
FIG. 1 is a view showing an example of the system configuration according to an embodiment.

The document management system illustrated in FIG. 1 includes, as function modules, a workspace DB (database) 10, a document group DB 11, a workspace processing unit 12, a same-groove document specifying unit 13, a distance (relevancy degree) calculating unit 14, a distance (relevancy degree) totaling unit 16, a target document receiving unit 18 and a relative document presenting unit 19.

Figure 3:
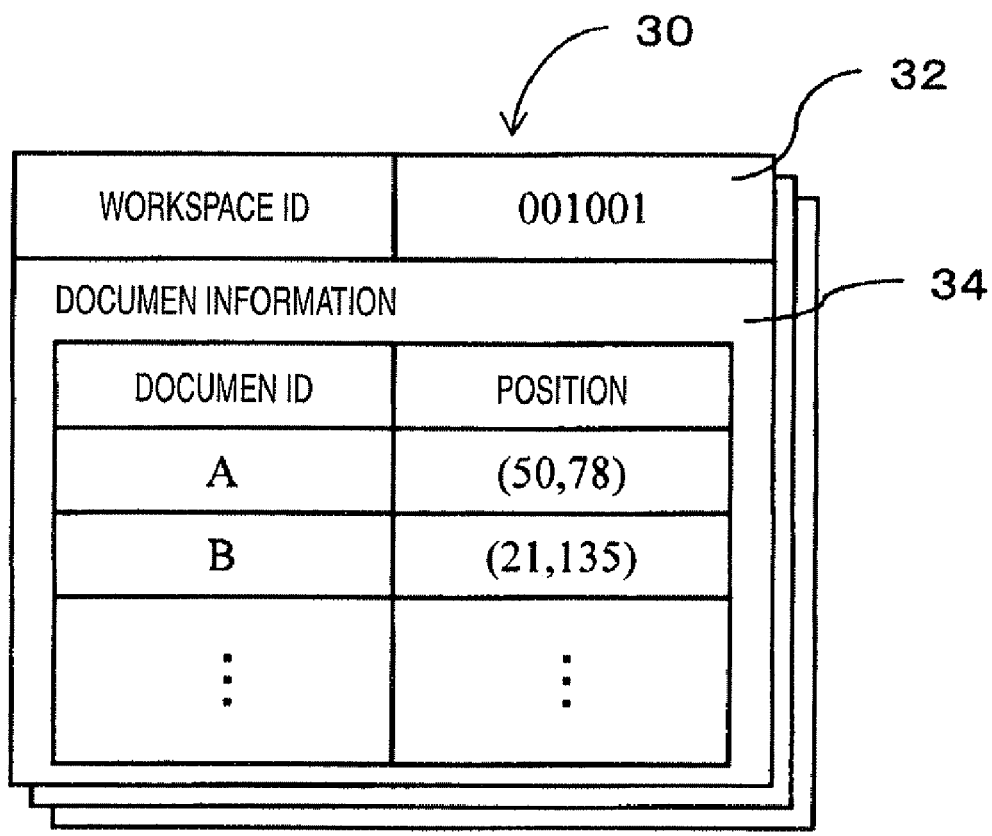
FIG. 3 is a view of an example of the data contents of a workspace DB.

The workspace DB 10 is a database storing the information for managing the workspace of each user. FIG. 3 shows an example of the data contents of the workspace DB 10. In this example, a workspace record 30 corresponding to a single workspace contains a workspace ID 32 and document information 34. The workspace ID is identification information for uniquely specifying the pertinent workspace. The document information 34 contains the "document ID" and "position" of each of the electronic documents stored in the pertinent workspace. The "document ID" is identification information of the pertinent electronic document. The "position" is position coordinates of the pertinent electronic document within the pertinent workspace. The workspace record 30 may contain other information (e.g. information indicative of the user corresponding to the pertinent workspace). The workspace DB 10 stores such a workspace record 30 by one for each workspace.

The substantive data of the electronic document is held in the document DB (not shown) correlated with the document ID.

The document group DB 11 registers the information on each document group. The document group is a group consisting of one or more electronic documents. An example of the data contents held by the document group DB 11 is shown in FIG. 4. In this example, the document group DB 11 registers the document IDs of the electronic documents belonging to the document group correlated with its ID (referred to as a group ID). The document group DB 11 may contain the attendant information on each document group. The attendant information may a changing history of the pertinent document group (history of registering or canceling the electronic document for the pertinent group), a message registered for the pertinent document group by the user, etc. The document groups are registered in the document group DB 11 by respective users. The user capable of registering the document group may be limited. Further, each user can register an electronic document for the document group registered in the document group DB 11. By access privilege management, the user capable of accessing each document group or the user capable of providing the electronic document to each document group may be limited.

The workspace processing unit 12 carries out the processing on the workspace according to a user's manipulation. This processing includes the processing of providing the screen of the workspace of the pertinent user and various kinds of processing for the electronic document displayed on the screen. The various kinds of processing for the electronic document include the processing of opening, moving, deleting and copying the electronic document according to a user's instruction.

Further, when the user performs the operation of e.g. opening the electronic document on the workspace, referring to the document group DB 11, the workspace processing unit 12 may provide the updating information on the document group to which the pertinent electronic document belongs. For example, the workspace processing unit 12 can provide, as the updating information, the electronic document, message, etc. registered in the document group after the timing when the user accessed the pertinent document group at a previous time (e.g. manipulating the electronic document in the pertinent document group). The timing when the user accessed the document group may be recorded on the document group DB 11.

The same-group document specifying unit 13, referring to the document group DB 11, specifies the same-group document belonging to the same group as the target document received by the target document receiving unit 18 (its details will be described later).

The distance (relevancy degree) calculating unit 14, referring to the workspace record 30 held by the workspace DB 10, particularly the position coordinates of each electronic document, calculates the distances between the electronic documents in the workspace. The distance (relevancy degree) calculating unit 14 may convert the distances calculated into relevancy degrees on the basis of a predetermined conversion function or conversion information such as a conversion table. For example, where it is set that the stronger the relevancy between the electronic documents, the higher is the numerical value of the relevancy degree, as regards the conversion information, it is defined that the smaller the distance, the higher is the relevancy degree.

The distance (relevancy degree) totaling unit 16 totals, for each electronic document, the distances or relevancy degrees between the electronic documents calculated by the distance (relevancy degree) calculating unit 14. Specifically, where presenting of the relative documents to a certain target document A is demanded by the user, the distance (relevancy degree) totaling unit 16 totals, for each electronic document X, the distance or relevancy degree between the target document A and each electronic document X and the distance or relevancy degree between each same-group document and each electronic document X. The same-group document may be excluded from the object for totaling.

The distance (relevancy degree) totaling unit 16 may exclude the electronic document X giving the distance exceeding a predetermined threshold value from the target document A (the electronic document excessively remote from the target document A) from the object of totaling the distances or relevancy degrees. Likewise, the electronic document excessively remote from the same-group document may be excluded from the object of totaling.

Using a concrete example, an explanation will be given of the processing of the distance (relevancy degree) totaling unit 16. It is assumed that only one of the workspace as illustrated in FIG. 2 is registered in the workspace DB 10 and the document A (22a) has been designated as the target document. Further, it is assumed that the documents H and I are the same-group documents corresponding to the document A. In this case, totaled for each of the documents B to G are the distances or relevancy degrees of the documents B to G for the target object A, the distances or relevancy degrees thereof for the same-group document H, the distances or relevancy degrees thereof for the target object I.

Further, there are records 30 of a plurality of workspaces within the workspace DB 10. Some workspaces include or do not include the target document A or the same-group document corresponding to the target document A. As regards the workspace including the target document A or the same-group document, the distance (relevancy degree) calculating unit 14 can acquire the distance or relevancy degree between the other electronic document X within the pertinent workspace and the target document A or the same-group document. The distance (relevancy degree) totaling unit 16, for each electronic document X, may total, within each workspace, the distances or relevancy degrees thus acquired between each electronic document X and the target document A or the same-group document.

In totaling, for example, within each workspace, the distances or relevancy degrees between the electronic document X and the target document A or the same-group document are added over all the workspaces; the adding result may be taken as a totaled value. As another example, the adding result is normalized by the number of the workspaces including the target document A or the same-group document; the normalizing result may be taken as the totaled value. Normalizing can be executed, for example, by the adding result by the number of the workspaces.

The target document receiving unit 18 receives designation of the target document (electronic document which is the target for extracting the relative documents) from the user. In one example, the target document may be designated by the user on the workspace screen given by the workspace processing unit 12 to the pertinent user. This is only an example. Otherwise, the target document may be designated by the user from the retrieval result of the electronic documents.

When the target document receiving unit 18 receives the designation of the target document, the distance (relevancy degree) totaling unit 16 provides the totaling result of the distance or relevancy degree of each electronic document for the target document to the relative document presenting unit 19. The totaling result includes, for each electronic document, the totaled value of the distance or relevancy degree between the pertinent electronic document and the target document. The relative document presenting unit 19, on the basis of the totaling result acquired from the distance (relevancy degree) totaling unit 16, presents any relative document to the user. Presenting the relative document may be done in the same manner as conventional presenting the retrieval result using a general retrieval result. For example, the extraction result screen on which the links to the electronic document are arranged in the order of a higher totaled value (i.e. stronger relevancy to the target document) may be provided to the user. Further, the electronic documents to be displayed on the extraction result screen may be limited to only the electronic documents having the intensity of relevancy of a predetermined degree or more. For example, where the distance (relevancy degree) totaling unit 16 calculates the totaled value of the distances, they are the electronic documents having the intensity of relevancy of a predetermined degree or less. Where the distance (relevancy degree) totaling unit 16 calculates the totaled value of the relevancy degrees, they are the electronic documents having the intensity of relevancy of a predetermined degree or more. The threshold value of the totaled value of the distances and the threshold value of the totaled value of the relevancy degrees, which are different from each other, may be previously determined. Further, on the basis of the totaled values, the electronic document with the strongest relevancy may be specified and presented as an extraction result to the user. Some grades such as "relevancy is strong", or "although relevancy is not strong but may be present" may be given for the totaled values; on the extraction result screen, each electronic document may be displayed discriminately for each grade. In this case, the discrimination in display may be done for example, by separating a display column for the respective grades or adopting display formats different for the respective grades. On such an extraction result screen, the user can designate various kinds of manipulation of e.g. selecting the link to the electronic document and opening the electronic document selected.

Next, referring to FIG. 5, an explanation will be given of an example of the flow of presenting processing of any relative document in the system shown in FIG. 1. In this processing, if the target document receiving unit 18 receives the designation of a target document from a user's terminal (S10), the same-group document specifying unit 13, referring to the document group DB 11, specifies any document belonging to the same group as the target document (the same-group document) (S11). The same-group document specifying unit 13 requires the distance (relevancy degree) totaling unit 16 to give the totaling result of the distance or relevancy degree of each electronic document for the target document and each same-group document. In response to this requirement, the distance (relevancy degree) totaling unit 16 requires the distance (relevancy degree) calculating unit 14 to calculate the distance or relevancy degree between each electronic document and the target document or each same-group document in each workspace. In response to this requirement, the distance (relevancy degree) calculating unit 14, referring to the workspace DB 10, calculates the distance or relevancy degree between each electronic document and the target document or each same-group document in each workspace (S12, S13). The distance (relevancy degree) totaling unit 16 totals the distances or relevancy degrees calculated by the distance (relevancy degree) calculating unit 14 for each electronic document (S14) and delivers the totaling result to the relative document presenting unit 19. On the basis of the totaling result, the relative document presenting unit 19 creates a screen indicative of the extraction result of any relative document and presents the screen to the user's terminal at a requirement source (S16, S18). In the illustrated example, on the basis of the totaling result, the relative document presenting unit 19 extracts any electronic document having the relevancy intensity of a predetermined degree or more as the relative document (S16) and presents the extraction result to the user (S18).

Figure 5:
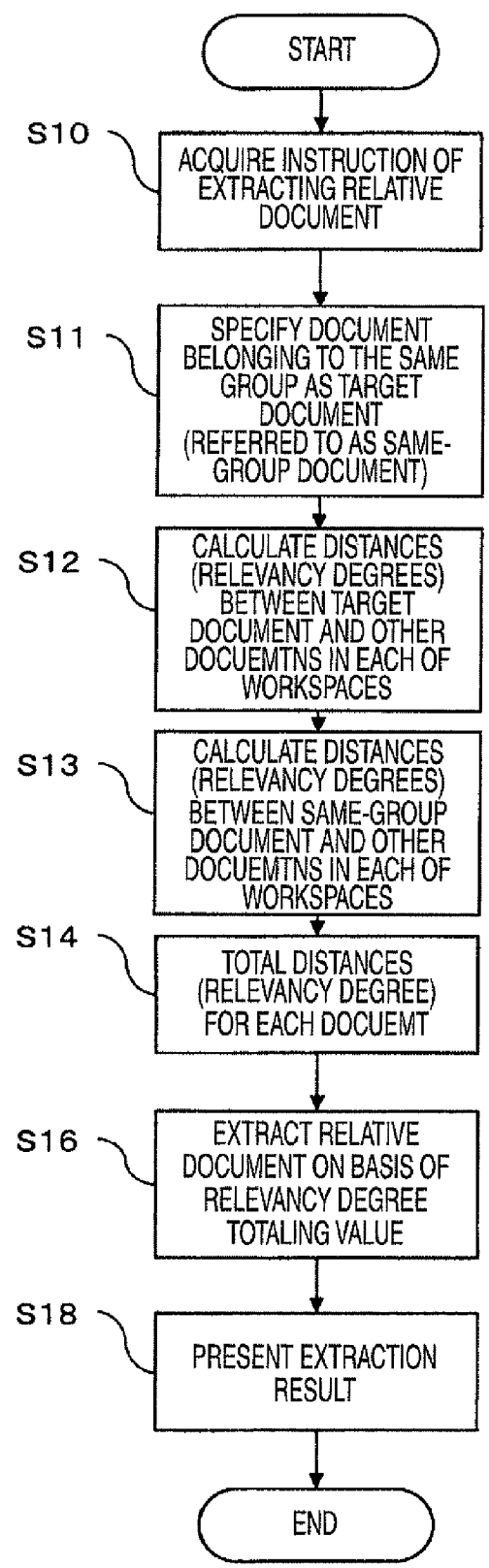
FIG. 5 is a flowchart showing an example of the processing procedure of extracting any relative document in the system of FIG. 1.

The processing procedure shown in FIG. 5 is only an example. In place of this procedure, for example, the totaled values of the distances or relevancy degrees between the electronic documents may be previously calculated to create a database; when an instruction of extracting any relative document is received from the user, the relative document presenting unit 19, referring to the database, may extract any relative document. The database may be updated at predetermined timings, for example periodically or when the user manipulates the electronic document within the workspace. In the updating processing, the distance (relevancy degree) calculating unit 14 and the distance (relevancy degree) totaling unit 16 may calculate the distances or relevancy degrees between the respective electronic documents and total for each electronic document.

In place of creating the database of the totaled values, the database of the distances or relevancy degrees between the electronic documents may be previously created. In this case, at every predetermined timings, the distances between the electronic documents are calculated by the distance (relevancy degree) calculating unit 14 and on the basis of the calculating result, the database is updated. When an instruction of extracting any relative document is received from the user, the distance (relevancy degree) totaling unit 16, referring to the database, totals, for each electronic document, the distances or relevancy degrees of the pertinent electronic document for the target document over a group of workspaces; on the basis of the totaling result, the relative document presenting unit 19 extracts any relative document.

Figure 6:
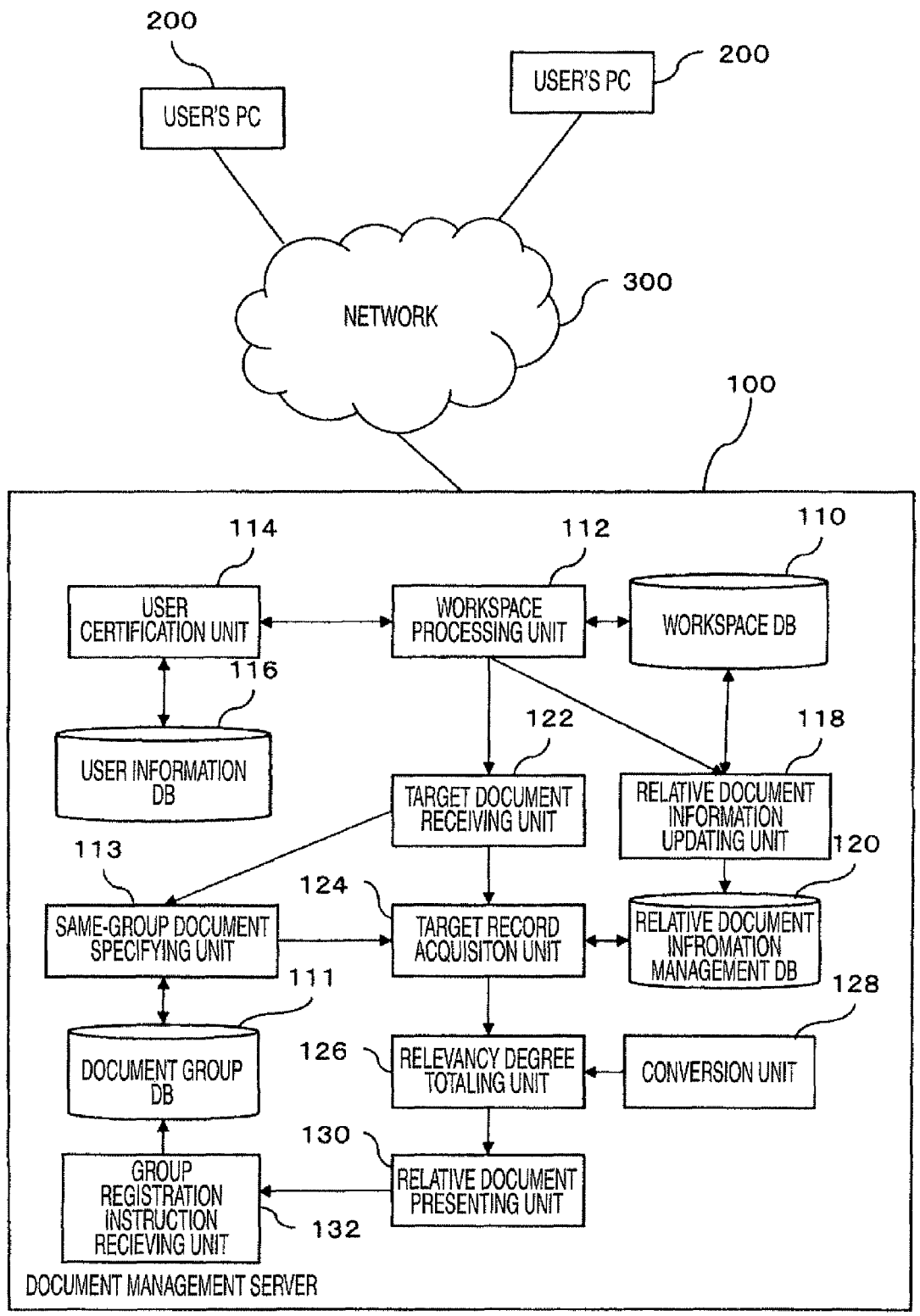
FIG. 6 is a view showing another example of the system configuration according to an embodiment.

Next, referring to FIGS. 6 to 15, an explanation will be given of another example of the embodiment of this invention. A document management server 100 illustrated in FIG. 6 is connected to user PCs (personal computers) through a network 300 such as an internet or LAN (Local Area Network). The user manipulates his own PC 200 to access the document management server 100 and accepts the service on the workspace.

Figure 7:
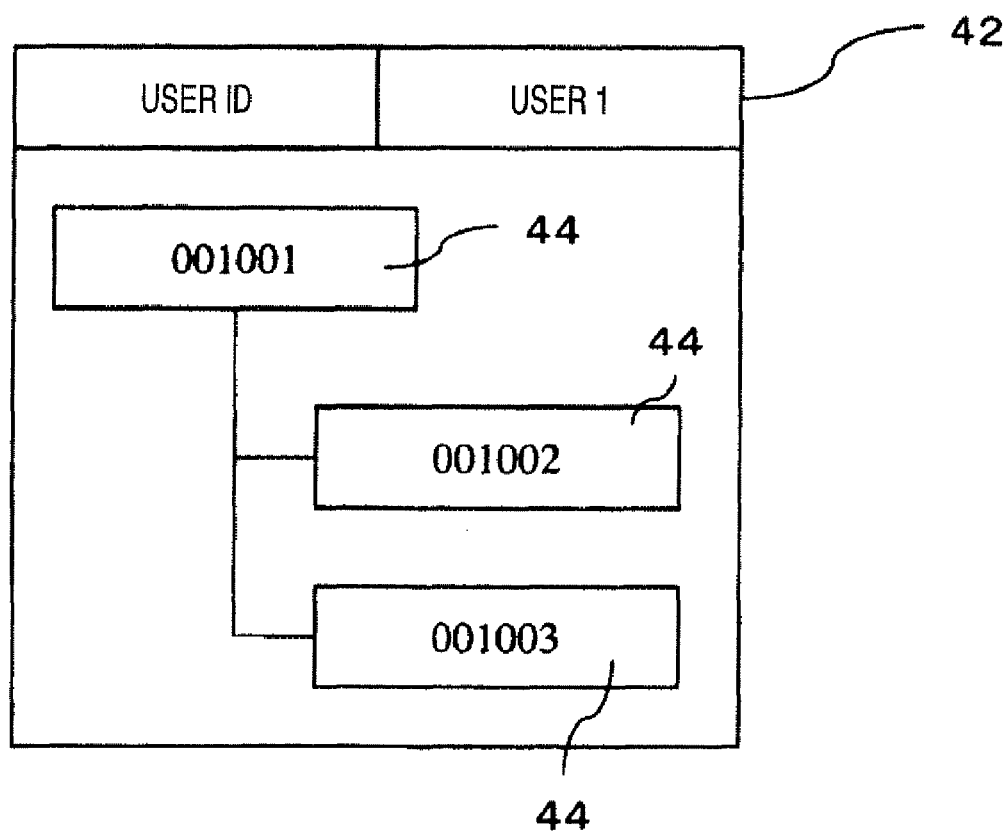
FIG. 7 is a view conceptually showing an example of the information on the correspondence between a user and a workspace.

A workspace DB 110 in the document management server 100, like the workspace DB 10 in FIG. 1, stores the workspace record defining each workspace. The workspace DB 110 may further register the information indicative of the correspondence between the user and workspace allotted to the pertinent user. FIG. 7 conceptually shows an example of the information on the correspondence. In this example, the information on the correspondence contains, for each user, a user's ID (discrimination ID) 42 and IDs 44 of one or more workspaces allotted to the pertinent user. Now, the concept of the "user" includes not only a person but also a user group consisting of plural persons. The user belonging to a certain user group can access the workspace(s) corresponding to the pertinent user group. In the example of FIG. 7, the workspaces allotted to the user constitute a tree structure. According to this example, each user can structure the tree structure of the workspaces corresponding to his own classifying manner.

A document group DB 111 registers the same data as the document group DB 11 in FIG. 1.

A workspace processing unit 112 executes the same processing as the workspace processing unit 12 in FIG. 1. A user certification unit 114 executes the certifying processing of the user who has sent access requirement to the workspace(s) via the user's PC 200. In order to perform the certifying processing of the user, known techniques such as password certification, living body certification or certification using a digital certificate can be employed. In the user certification processing, the user certification unit 114 refers to a user information DB 116. The user information DB 116 registers the certification information of each user, e.g. user's ID and password, living body information (e.g. the special feature of a fingerprint), or a pair with the digital certificate. The user information DB 116 may register the user's attribute information other than the certification information. Such attribute information contains e.g. a user's managerial position of an organization such as an enterprise, or user assigned group. Only if the user certification by the user certification unit 114 is successful, the user is permitted to access the workspace(s).

A same-group document specifying unit 113, like the same-group document specifying unit 13 in FIG. 1, referring to the document group DB 111, specifies any same-group document belonging to the same document group as the target document whose designation has been received by a target document receiving unit 122.

A relative information management DB 120 registers, for each electronic document, its distances or relevancy degrees for other documents within each workspace to which the pertinent electronic document belongs. FIG. 8 shows an example of the data contents of the relative information management DB 120. In this example, the relative information management DB 120 registers, for each electronic document (in the figure, indicated as the "target document"), one record correlated with the document ID of the target document. The record of the one target document registers the records of the workspaces correlated with the IDs of the workspaces in which the target document is included. The record of the workspace includes the entries of other electronic documents existing in the pertinent workspace (in the figure, indicated as peripheral documents). The entry of the one peripheral document includes the ID of the pertinent document and a distance from the pertinent document to the target document. In FIG. 8, the value of the distance is rounded by the unit of 1, but this is only an example. Further, in FIG. 8, only the electronic documents having the distance from the target document of a certain threshold value (e.g. 5) or less (i.e., which is near to the target document) are listed as the peripheral document, but they are also only an example. A document management server 100 in FIG. 6, when it receives an instruction of extracting any relative document from the user, extracts the relative document(s) referring to the relative information management DB 120.

A relative information updating unit 118 performs the processing of updating the relative information management DB 120 at predetermined timings, for example periodically or when the user manipulates the electronic document. In the updating processing, the relative information updating unit 118 calculates the distances or relevancy degrees between the respective electronic documents in each workspace on the basis of the information within the workspace DB 110 at the updating timing and updates the information on the peripheral documents and distances within the relative information management DB 120 on the basis of the calculating result. The updating processing will be described later in detail.

A target document receiving unit 122, like the target document receiving unit 18 in FIG. 1, receives designation of the target document which is the target for extracting any relative document from the user's PC 200. A target record acquisition unit 124 acquires, from the relative information management DB 120, the record of the target document received by the target document receiving unit 122 and the record of each same-group document specified by the same group document specifying unit 113, respectively.

Figure 9:
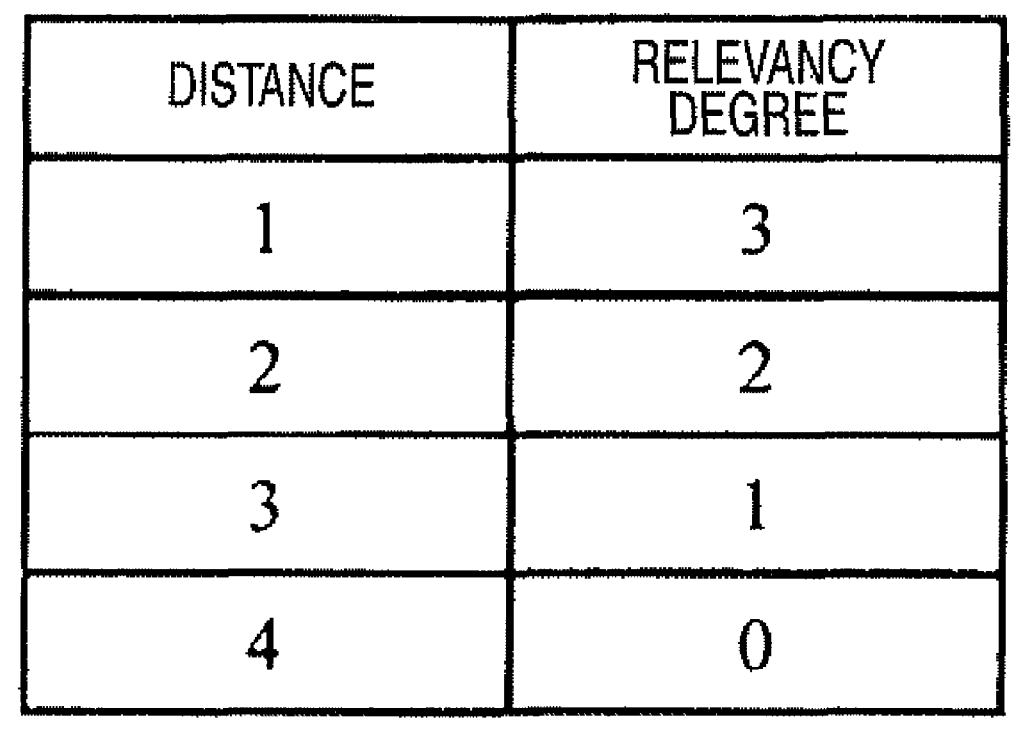

A relevancy degree totaling unit 126 converts the distances of each peripheral document contained in the records of the target document and each same-group document acquired by the target record acquisition unit 124 into the relevancy degrees on the basis of conversion information and totals the relevancy degrees of the converted result for each peripheral document. The conversion information 128 may be a table format as illustrated in FIG. 9 or a function for conversion. In the example of FIG. 9, for each distance, the value of the relevancy degree corresponding to the distance is registered. The method of totaling may be the same as that in the distance (relevancy degree) totaling unit 16.

A relative document presenting unit 130, like the relative document presenting unit in FIG. 1, creates screen information of the extraction result of the relative document(s) on the basis of the totaling result in the related degree totaling unit 126 and returns it to the user's PC 200 at the requirement source.

Next, referring to FIG. 10, an explanation will be given of an example of the processing procedure of the relative information updating unit 118 in the system of FIG. 6. In this procedure, in synchronism with an opening instruction for the electronic document on the workspace screen (see FIG. 2), the record of the pertinent workspace will be updated in the records in which the pertinent electronic document is the target document in the relative information management DB 120.

This procedure starts when the workspace processing unit 112 receives an instruction of opening the electronic document in a certain workspace from the user's PC 200 (S100). At this time, the relative information updating unit 118 calculates, in the pertinent workspace, the distances between the electronic document (referred to as the target document) which is an object for opening and other electronic documents, and specifies any peripheral document having the distance of a predetermined threshold value or less (S101). The distances are calculated on the basis of the position coordinates of each electronic document in the record of the pertinent workspace within the workspace DB 110. The threshold value of the distance for discriminating the peripheral document is previously set in the document management server 100.

Further, the relative information updating unit 118, referring to the records of the target document within the relative information management DB 120, examines whether or not there is a record of the pertinent workspace (S103). If there is no record of the pertinent workspace in the record of the target document, it is created (S104). The procedure proceeds to step S105. At this timing of creation, the record of the pertinent workspace does not contain the entry of the peripheral document.

In step S105, the relative information updating unit 118, on the basis of the information on each peripheral document specified in step S101 and its distance, updates the record of the pertinent workspace of the records of the target document within the relative information management DB 120. After this updating, the workspace processing unit 112 opens the target document (S106).

Figure 11:
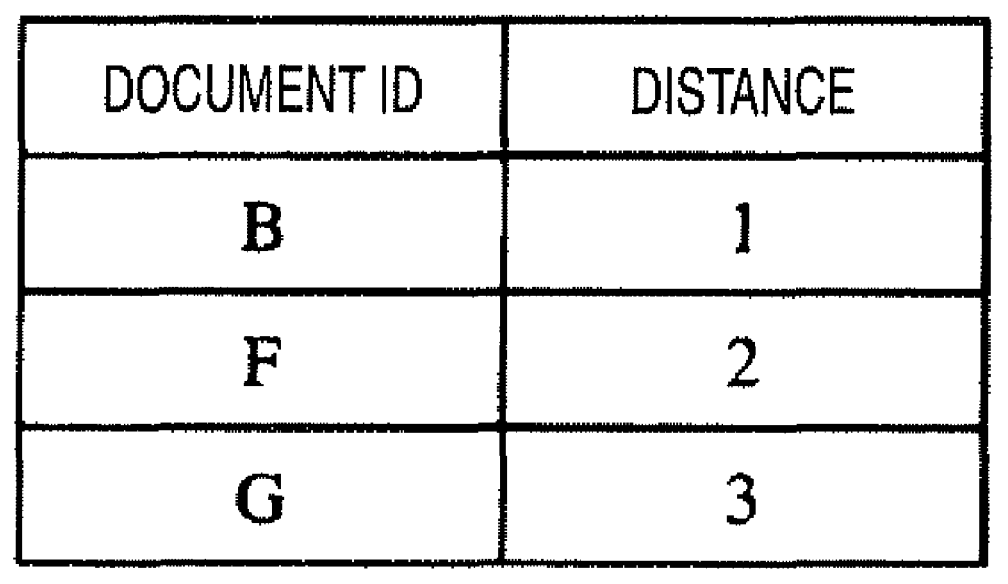

For example, where the user instructs to open the target document A in the workspace 20 illustrated in FIG. 2, as illustrated in FIG. 11, the electronic documents B, F and G are specified as the peripheral documents. In this example, the document too remote from the target document A is not adopted as the peripheral document. Their distances from the target document are obtained as 1, 2 and 3. On the basis of the information on each peripheral document and its distance, of the data contents within the relative information management DB 120 illustrated in FIG. 8, the distance of each peripheral document in the record of the workspace 20 in the records of the target document A is updated.

Figure 10:
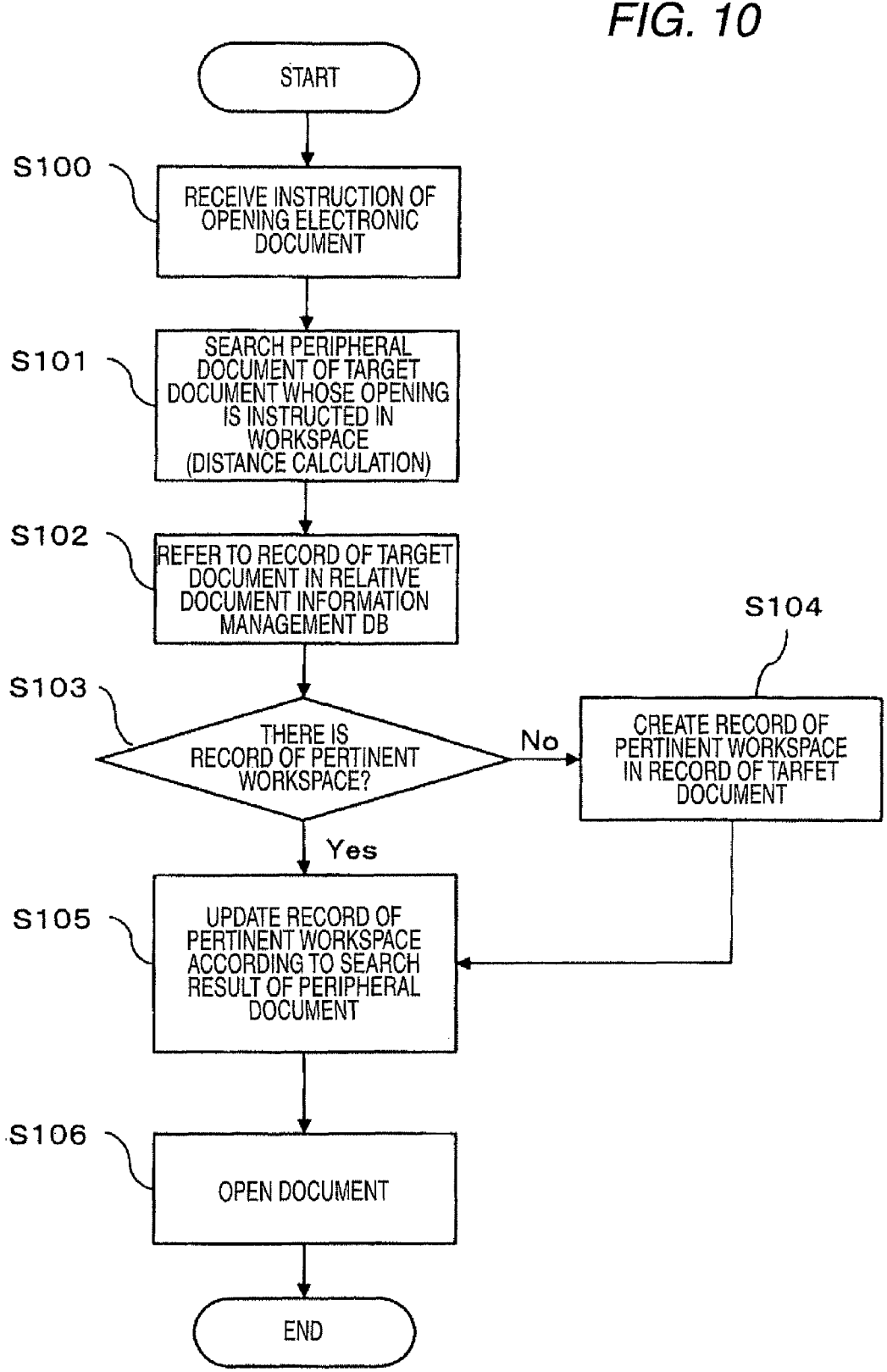
FIG. 10 is a flowchart showing an example of the processing procedure in a relative information updating unit.

In the example of FIG. 10, only the record of the electronic document whose opening was instructed was updated. The record of each of other electronic documents existing in the workspace in which the opening was instructed may be updated.

Further, in the example of FIG. 10, the record was updated using the opening of the electronic document as a trigger. Without being limited to this, the record may be updated using the other operation for the electronic document as the trigger.

Next, referring to FIGS. 12 and 13, an explanation will be given of the processing procedure of extracting any relative document by the document management server.

In this procedure, when the user manipulating the user's PC 200 selects the target document on the workspace screen provided by the workspace processing unit 112 and instructs to extract any relative document for the target document, the target document receiving unit 122 receives this instruction (S200). The, the same-group document specifying unit 113, referring to the document group DB 111, specifies any same-group document corresponding to the target document (S201). Next, the target record acquisition unit 124, referring to the relative information management DB 120, determines if there is the record corresponding to the target document received by the target document receiving unit 122 or the same-group document(s) specified by the same-group document specifying unit 113 (S203). Now, if there is neither record corresponding to the target document nor record corresponding to the same group document, the relative document presenting unit 130 determines that there is not relative document (S210) and returns the extraction result indicative of this fact to the user's PC 200 (S209).

In step S203, if it is determined that there is the record of the target document or the same group document in the relative information management DB 120, the target record acquisition unit 124 acquires the records of the target document and each same-group document. The relevancy degree totaling unit 126 attempts to acquire the top peripheral document entry contained in these records (S204). By this attempt, if the peripheral document entry (i.e. document ID and distance) can be acquired (the determination in S205 is affirmative (YES), i.e. the processing is not completed to reach the final peripheral document entry in a group of records acquired), the distance is converted into the relevancy degree (S206) using the conversion information 128. On the basis of the relevancy degree, the totaled value corresponding to the pertinent peripheral document on a totaling table is updated (S207). Now, the totaling table, as illustrated in FIG. 13, is a table on which the totaled value of the relevancy degrees of each peripheral document which is correlated with its document ID is registered. Where the totaled value is an added result of the relevancy degrees, in step S207, the relevancy degree may be added to the totaled value corresponding to the pertinent peripheral document. Where the added result normalized with the number of the workspaces including the pertinent target document is assumed as the totaled value of the relevancy degrees, the relevancy degree totaling unit 126 may execute the totaling to reach the final peripheral document in the record of the pertinent target document and may normalize the final added result for each peripheral document thus obtained with the number of the workspaces including the pertinent target document.

The procedure returns to step S204. From the record of the target document or same-group document acquired from the relative information management DB 120, the subsequent peripheral document ID and distance are acquired. In this manner, the processing of step S205 et seq. is repeated.

For example, it is assumed that the relative information DB 120 is such as shown in FIG. 8, and the target document designated by the user in step S200 is document A. Further, it is assumed that in step S201, as the same-group document of the target document A, documents H and I have been specified. In this case, the relevancy degree totaling unit 126, first in step S204, acquires the distance "1" of peripheral document B from the record of the workspace ID "1" in the record of the document A and further from the top peripheral document entry. The relevancy degree totaling unit 126, in step S206, converts the distance "1" into the relevancy degree "3" on the basis of the table shown in FIG. 9, and in step S207, adds the relevancy degree "3" to the totaled value of the peripheral document B ("0" at this time). Next, the relevancy degree totaling unit 126, again in step S204, acquires the distance "2" of peripheral document F from the second peripheral document entry in the record of the workspace ID "1", in step S206 converts this distance into the relevancy degree "2" and in step S207, adds this relevancy degree to the totaled value of the peripheral document on the totaling table. Next, the distance "3" of subsequent peripheral document G is converted into the relevancy degree "1" which is in turn added to the totaled value of the peripheral document G. The above processing is repeated to reach the final peripheral document entry over the records of all the workspaces in the record of the target document A. Thereafter, for the same-group documents H and I also, likewise, the distance of each peripheral document is read from the record of the pertinent document H, I in the relative information management DB 120, and converted into the relevancy degree which is in turn added to the totaled value of each peripheral document.

When the totaling is completed to reach the final peripheral document entry in the pertinent target document and each same-group document, the determination in step S205 is "NO". In this case, referring to the totaling table, the relative document presenting unit 130 extracts the relative document(s) (S208). For example, if the final totaling result is such as shown in FIG. 13 and the threshold value of the relevancy degree for determining the relative document is "7", the documents B and C are extracted as the relative document. The relative document presenting unit 130 creates a screen indicative of this extraction result and information of the screen to the user's PC 200 (S209).

Figure 14:
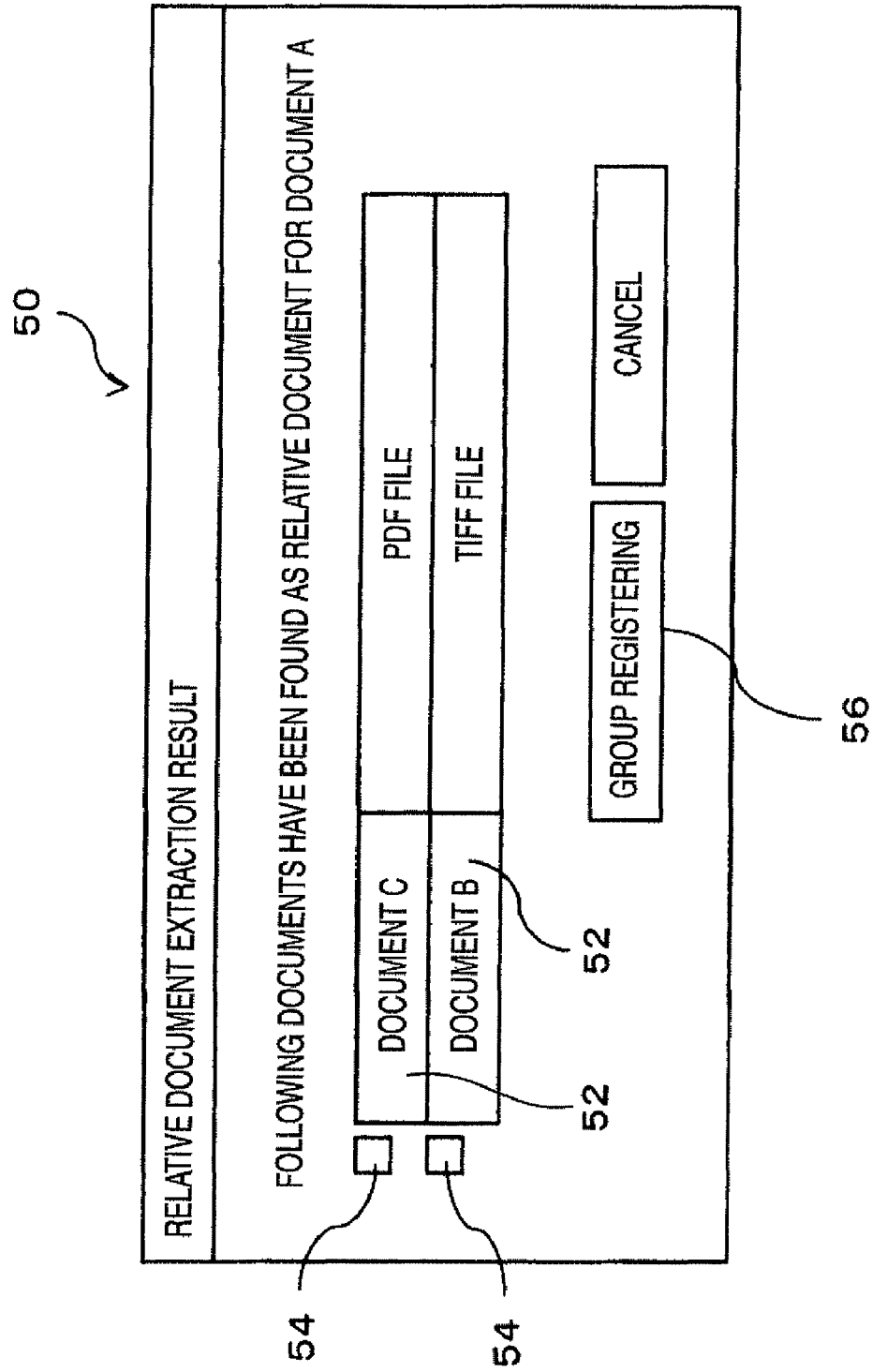
FIG. 14 is a view showing an example of the display screen of a relative document extraction result.

FIG. 14 shows an exemplary display of a screen 50 indicative of the extraction result. In this example, document names 52 of the documents B and C extracted as candidates of the relative document are displayed as a list. Further, in this example, as information for the user to determine each relative document, the file format of each relative document is displayed but this is only an example. Only the document name may be displayed, or the other attribute information of the relative document, reduced image thereof, etc. may be displayed. Further, when the user click-manipulates the document name 52 of each relative document, the relative document may be opened so that the user can recognize the contents of the relative document.

Further, in the example of FIG. 14, a check box 54 is displayed for each relative document. The user can select the check box 54 using an input device such as a pointing device attached to the user's PC 200. When a group registering button 56 is pressed by the input device such as the pointing device, the relative document with its check box 54 being selected is registered in the document group to which the pertinent target document belongs within the document group DB 11. Namely, the user can explicitly register, in the document group DB 11, as the document belonging to the same group as the target document, the relative document estimated by the document management server 100 on the basis of the distance from the target document and same-group document in the workspace.

Figure 15:
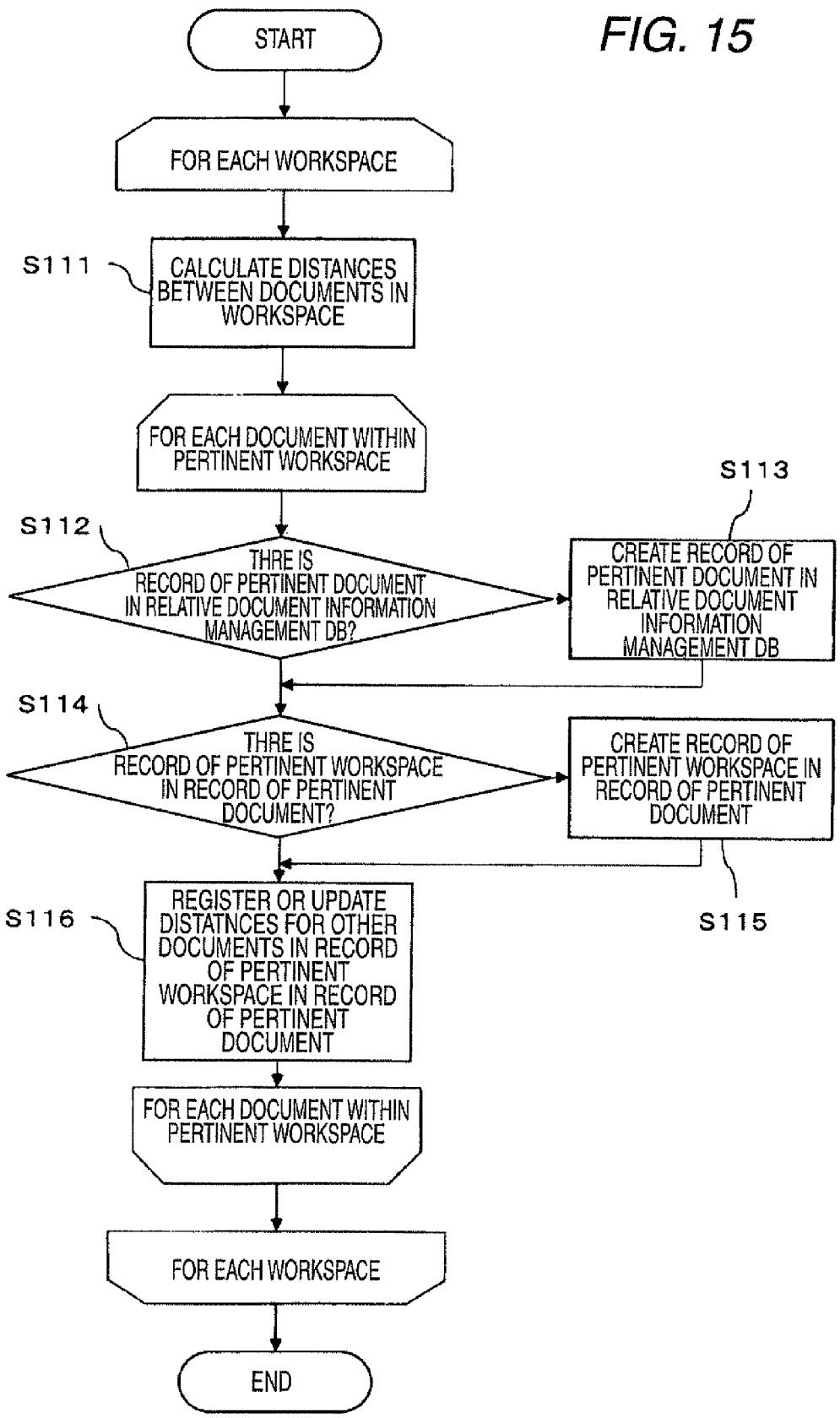
FIG. 15 is a flowchart showing another example of the processing procedure of a relative information updating unit.

Next, referring to FIG. 15, an explanation will be given of another example of the processing of updating the relative information management DB 120. In the processing example shown in FIG. 10, the relative information management DB 120 was partially updated according to the operation of opening the electronic document in the workspace. On the other hand, in the procedure shown in FIG. 15, the entire relative information management DB 120 will be updated at predetermined updating timings, for example periodically or at the timings designated by the user.

In this procedure, when a predetermined updating timing comes, first, in step S111, the record of a certain workspace registered in the workspace DB 110 is taken out and the distances between the respective electronic documents within the pertinent workspace are calculated on the basis of the position coordinates of each electronic document. The processing in steps S112 to S116 will be executed for each electronic document within the pertinent workspace.

Specifically, in step S112, it is checked whether or not there is a record of the pertinent electronic taken as a target document within the relative information management DB 120. If not, in step S113, this record is created (at this timing, the contents of the record are empty). Next, in step S114, it is checked whether or not there is a record of the pertinent workspace in the record of the pertinent target document. If not, this record is created (at this timing, the contents of the record are empty). Further, the distances between the pertinent target document and other respective electronic documents (peripheral documents) acquired in step S111 are written or overwritten as the distances of these electronic documents (peripheral document) within the record of the pertinent workspace (S116).

The processing of the above steps S111 to S116 is executed for each workspace within the workspace DB 110 so that the relative document management DB 120 is updated.

In the example described above, although the distance of each peripheral document was registered in the relative information management DB 120, in place of this, the relevancy degree may be registered. In this case, the relevancy degree totaling unit 126 is not required to convert the distance into the relevancy degree.

Further, in place of converting into the relevancy degree, totaling may be made for the distances as they are, and the relative document may be extracted according to the concept that as the totaled value is smaller, the peripheral document has strong relevancy. For example, the peripheral document having a totaled value of the distances not larger than the threshold value is extracted as the relative document.

Figure 16:
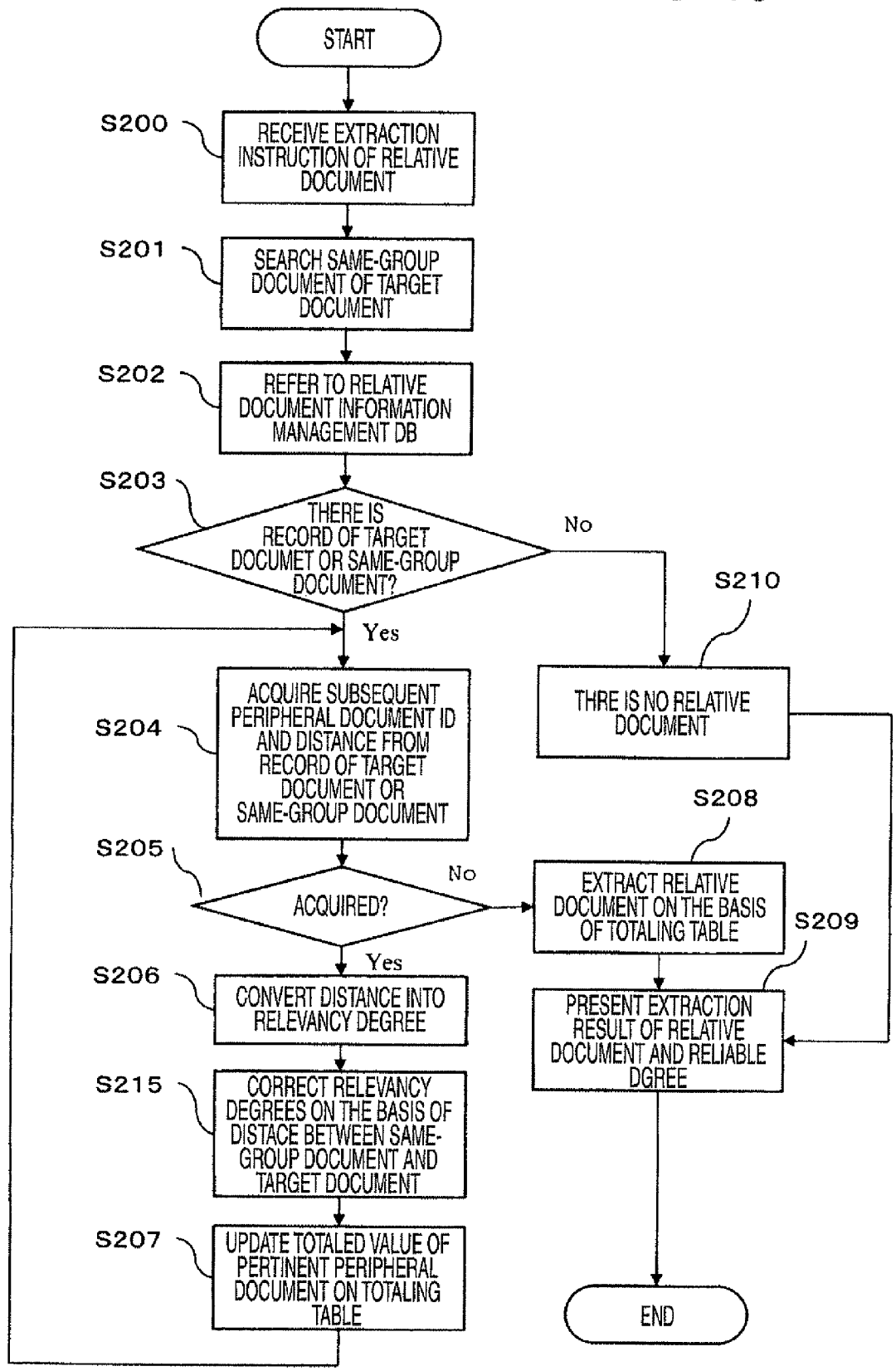
FIG. 16 is a flowchart showing an example of the processing procedure of a first modification of the embodiment.

Next, referring to FIG. 16, an explanation will be given of a first modification of the embodiment of this invention. In FIG. 16, like reference symbols refer to like steps in FIG. 12.

In this modification, the relevancy degree between the peripheral documents and the same-group document calculated in step S206 are corrected according to the distance between the same-group document and the target document (S215). As the distance between the same-group document and the target document is nearer, the relevancy degrees are corrected to higher values (values indicative of stronger relevancy). For example, it is assumed that in step S204, the values of the distances of the peripheral document entries in the record of a certain workspace have been acquired in the record of the same-group document within the relative information management DB 120. In this case, in step S215, the distance between the same-group document and the target document (designated in step S200) within the pertinent workspace is acquired, and according to the distance, the relevancy degree calculated in step S206 is corrected. The correction may be done using a table indicative of the correspondence between the range of a distance and correction coefficients. Specifically, the correction coefficient corresponding to the distance between the same-group document and the target document is read out, and the relevancy degree is multiplied by the correction coefficient. This is only an example. For example, the correction may be done by adding the correction coefficient to the relevancy degree. Further, in place of the table, a function may be employed. For example, the function can be employed which outputs the relevancy degree corrected when the distance between the same-group document and the target document and the relevancy degree are inputted. Where there is not the target document within the workspace to which the peripheral document entries acquired in step S204 belong, for example, a rule (table, function, etc.) giving a lower relevancy degree than where there is the target document may be provided.

Figure 17:
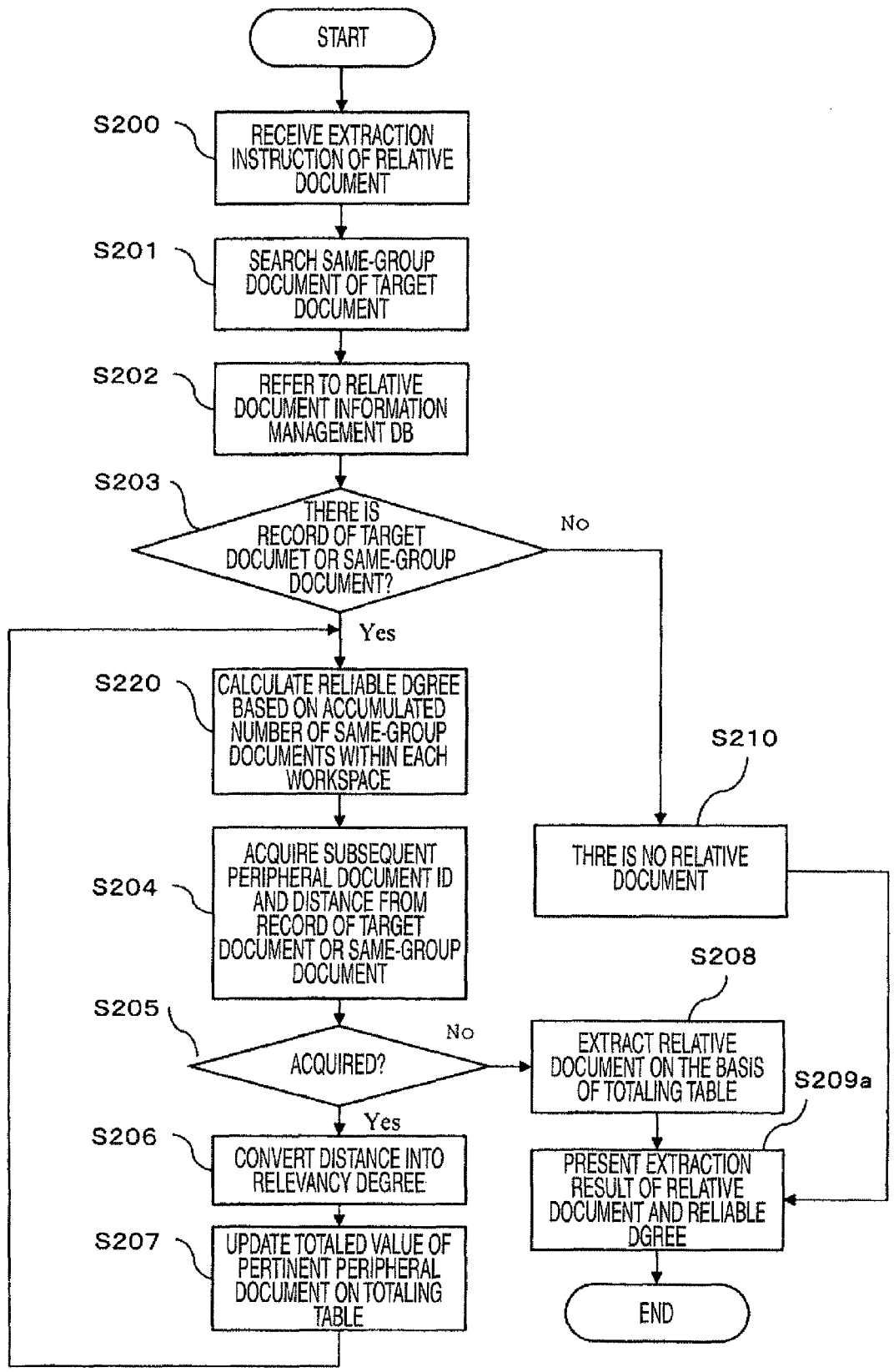
FIG. 17 is a flowchart showing an example of the processing procedure of a second modification of the embodiment.

Next, referring to FIG. 17, an explanation will be given of a second modification of the embodiment of this invention. In FIG. 17, like reference symbols refer to like steps in FIG. 12.

In this modification, information of reliable degree is added to the extraction result of the relative document presented by the relative document presenting unit 130. The reliable degree is calculated on the basis of the number of times when the same-group document corresponding to the target document for instructing to extract any relative document appears in a group of workspaces. In this system, a plurality of symbol images of the same electronic document may be arranged within a single workspace. For example, where in a certain workspace, a single same-group document corresponding the target document is arranged and in another workspace, two same-group documents corresponding to the target document are arranged, it is counted that there are three same-group documents in total in the workspace DB 110. Generally, when the same-group document appears at a larger number of times, it means that the extraction result of the relative document is supported by a larger number of samples. In this case, the reliable degree of the extraction result is high.

So, in this modification, in step S203, if it is determined that there is the record of the target document within the relative information management DB 120, the document management server 100, in step S220, referring to the workspace DB 110, acquires the number of times when the same-group document corresponding to the target document appears in the group of workspaces, and converts the number of the workspaces into the reliable degree using a predetermined function. In step S209a, the relative document presenting unit 130 presents the extraction result screen indicative of both the extraction result of the relative document and its reliable degree to the user.

The reliable degree may be acquired considering not only the appearing number of the same-group document but also that of the target document.

Next, referring to FIGS. 18 and 19, an explanation will be given of a third modification of the embodiment. In this modification, on the basis of the relationship between a user (referred to as user U) who instructed to extract any relative document for the target document and a user (referred to as user V) corresponding to each individual workspace S, in each workspace S, the relevancy degree between the pertinent target document A or its same group document and another electronic document X will be corrected. Specifically, as the relationship between the user U and the user V is stronger, the relevancy degree between the target document A or its same-group document and the electronic document X within the workspace S is corrected at a larger value.

For this third modification, the document management server 100 stores, for example, a user relationship table illustrated in FIG. 18. The user relationship table illustrated in FIG. 18 includes the value of intensity (weight) of relevancy between the users. This user relationship table is symmetrical with respect to a diagonal line (indicative of the relationship between the same users). For example, assuming that the user on a vertical axis is the user U who designated the target document, each cell on the row corresponding to the pertinent user represents the weight of the user V in each workspace corresponding to the user U. A larger value of the weight indicates that the relationship to the pertinent user is stronger.

Figure 12:
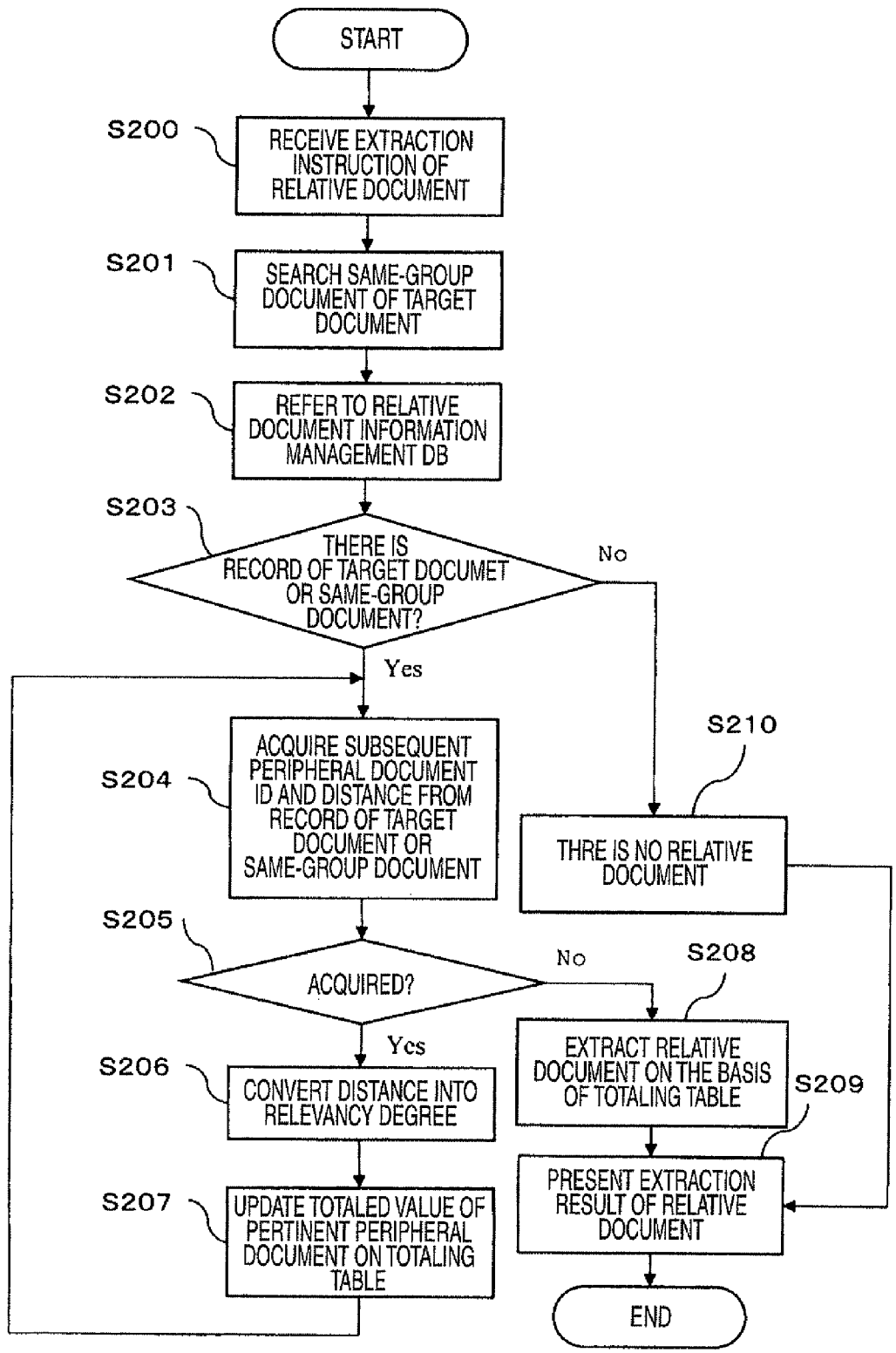
FIG. 12 is a flowchart showing an example of the processing procedure of a document management server when extraction of a relative document is instructed.
Figure 19:
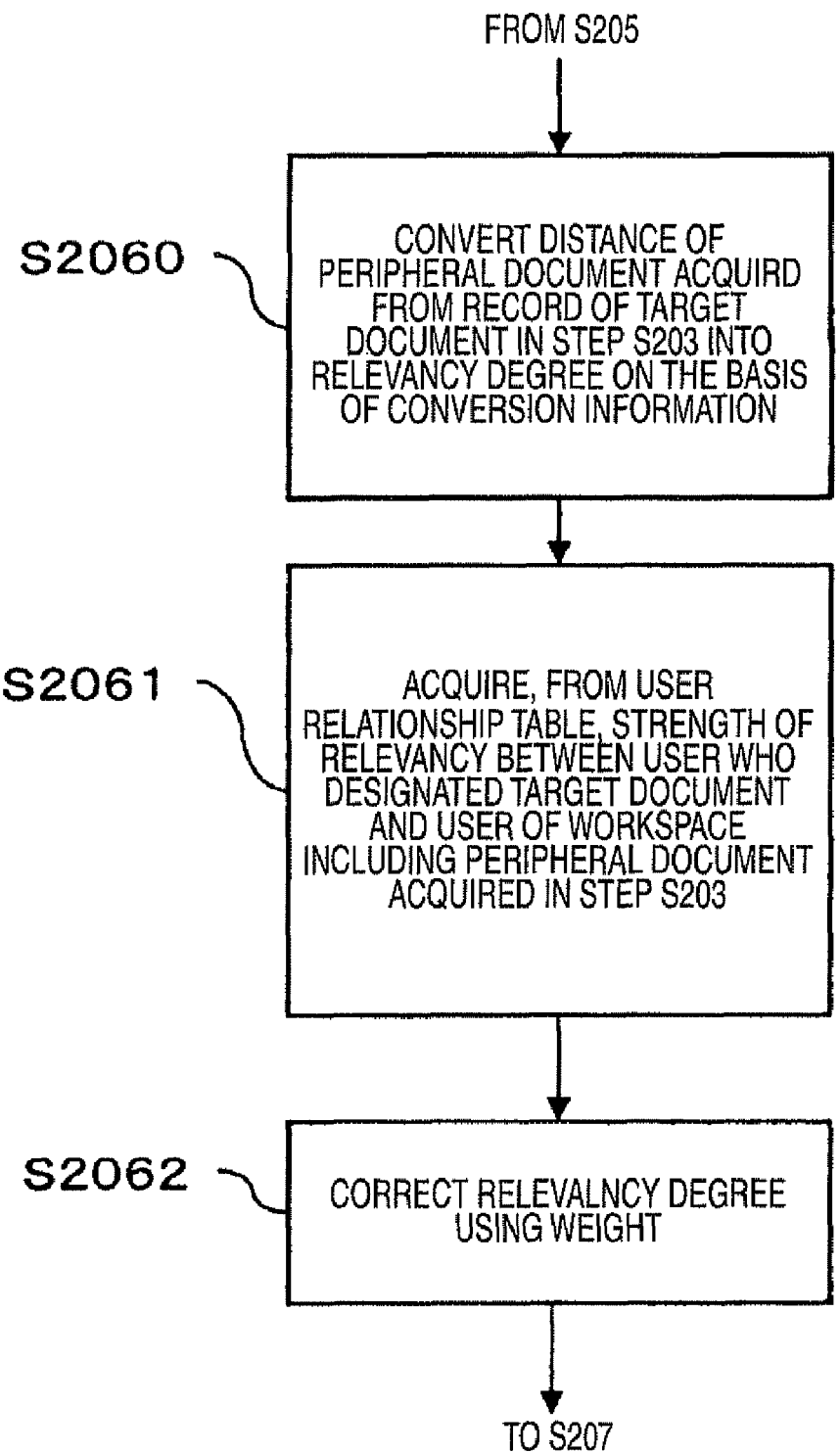
FIG. 19 is a flowchart showing an example of the processing procedure of the third modification of the embodiment.

The processing of this third modification can be realized by changing step S206 in the procedure of extracting any relative document illustrated in FIG. 12 or 17 as illustrated in FIG. 19. In the procedure as illustrated in FIG. 19, the relevancy degree totaling unit 126 converts the distances of the peripheral documents acquired from the record of the target document or same-group document in step S204 (see FIG. 12, 16 or 17) into the relevancy degrees on the basis of the conversion information 128 (S2060). This conversion processing may be the same as in step S206. Further, the relevancy degree totaling unit 126 acquires the weight value indicative of the intensity of relevancy between the user U who designated the target document in step S200 (see e.g. FIG. 12) and the user V of the workspace including the peripheral document acquired in step S204 from the user relationship table illustrated in FIG. 18 (S2061). Now, on the user relationship table, the row of the user U and the column of the user V are selected from the vertical axis and from the horizontal axis, respectively. The weight value of the cell where the pertinent row and column intersect is acquired. In the processing of step S2061, where the information of the top peripheral document B has been acquired from the record of the workspace ID "1" in the relative information management DB 120 in step S204, the user corresponding to the workspace ID "1" may be required from the workspace DB 110 and acquired as the above user V.

The relevancy degree totaling unit 126 corrects the relevancy degree acquired in step S2060 by the weight value (S2062). In this correction, for example, the relevancy degree may be added with or multiplied by the weight value according to a predetermined operation. Inversely speaking, the weight value may be previously set at a value corresponding to the operation. Using the relevancy degree corrected in step S2062, the totaling table may be updated in step S207 (refer to FIG. 12 etc.).

In the example of FIG. 19, at the stage of totaling the relevancy degrees after the instruction of extracting any relative document is received, the relevancy degree is corrected according to the intensity of relevancy between the users. This is only an example. In place of this, for example, at the stage of registering the distance or relevancy degree on each peripheral document entry of the relative information management DB 120, the distance or relevancy degree may be previously corrected by the weight value corresponding to the intensity of relevancy between the users.

Further, using the user relationship table as illustrated in FIG. 18 is not dispensable. In place of this, for example, the weight of the relationship may be acquired according to the rule in which where the user U and the user V belong to the same group within an organization, a larger weight is set than where they do not.

Next, referring to FIGS. 20 and 21, an explanation will be given of a fourth modification. In this modification, automatic line-up of a group of electronic documents within a workspace is taken in consideration. For example, some operating systems have a function of automatically lining up a group of objects on a desktop screen in order of attribute values such as a name or updating date. The workspace processing unit 12 or 112 (see FIGS. 1 and 6) may also have a function of automatically lining up the respective electronic documents within the workspace again in order of the designated attribute values. By this function, where the electronic documents within the workspace are automatically lined up, the distances between the electronic documents within the workspace do not reflect the user's will so that they are not suitable to estimate the intensity of relevancy between the electronic documents. So, in the fourth modification, where the electronic documents are lined up in the workspace, the distances between the electronic documents within the workspace are not caused to be reflected on the totaled value of the relevancy degrees.

For this purpose, as an example, the workspace DB 110 is caused to have line-up flag information as illustrated in FIG. 20. In the example of FIG. 20, the line-up flag information contains a line-up flag for each workspace. Where a group of electronic documents within the workspace have been automatically lined up, the line-up flag of the pertinent workspace is set to "1". Further, for example, where any electronic document within the workspace has been moved by a drug-and-drop operation, the line-up flag within the workspace is reset to "0".

Figure 21:
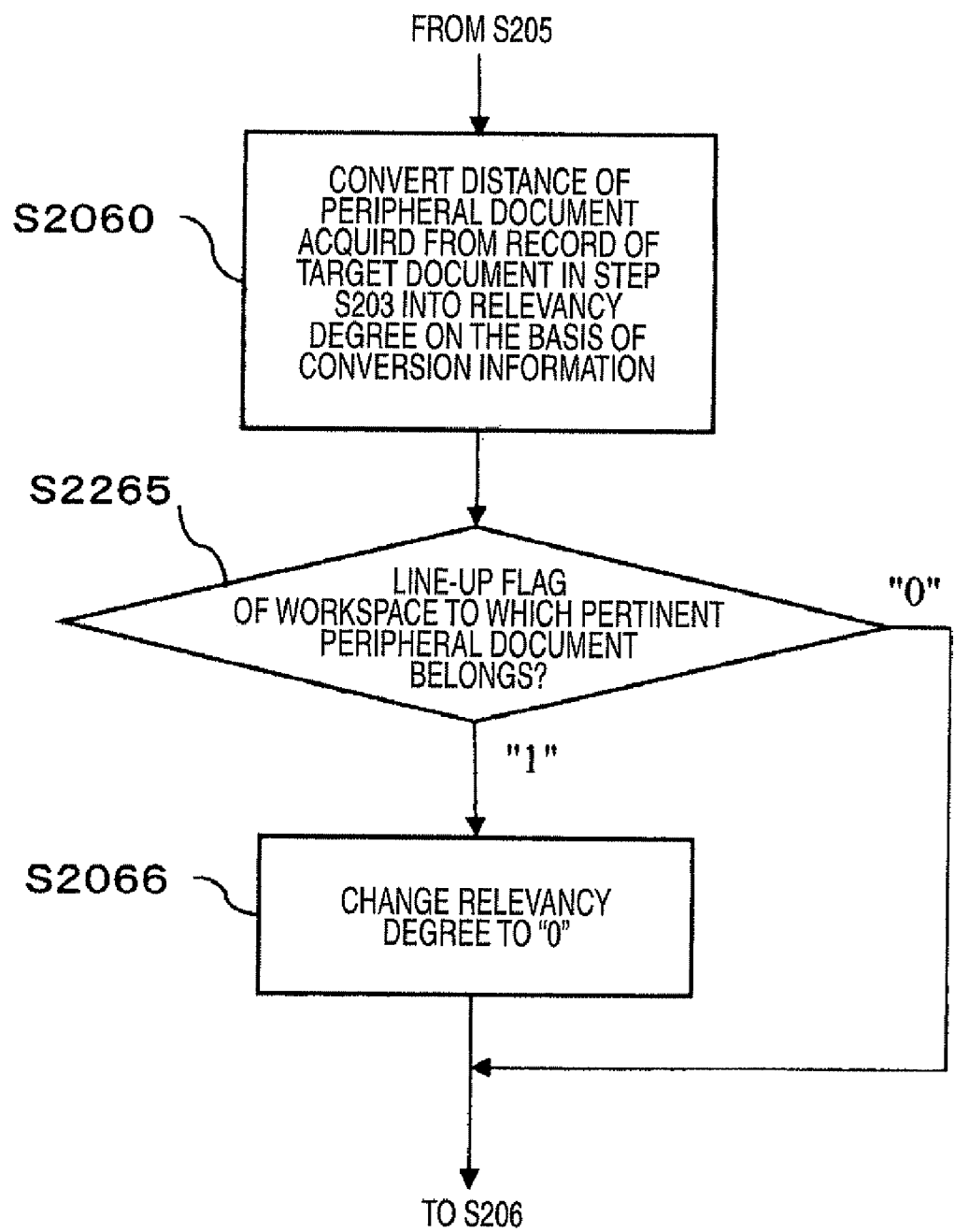
FIG. 21 is a flowchart showing an example of the processing procedure of a fourth modification of the embodiment.

For example, as shown in FIG. 21, after having converted the distance of the peripheral document in step S2060 into the relevancy degree, referring to the line-up flag information, the relevancy degree totaling unit 126 determines the value of the line-up flag of the workspace to which the peripheral document belongs (S2265). As a result of the determination, if the line-up flag is "1", the relevancy degree acquired in step S2060 is changed to "0" (the value of "0" is only an example, and may be a prescribed value other than "0") (S2066). In step S207, the relevancy degree "0" is caused to be reflected on the totaling table. On the other hand, if the line-up is "0", the relevancy degree acquired in step S2060 is caused to be reflected on the totaling table, as it is, in step S206.

Additionally, in the example of FIG. 21, where the line-up flag is "1" at the stage of totaling the relevancy degrees, the relevancy degree is changed to the prescribed value such as "0". This, however, is only an example. In updating the relative information management DB, referring to the line-up information, the distance or the relevancy degree of each peripheral document in the record of the workspace with the line-up flag of "1" may be changed to a prescribed value.

In the embodiment and its modifications described above, on the basis of the distance (or relevancy degree) between the same target document and each of the other peripheral documents in each workspace, the totaled value of the relevancy degrees of each peripheral document for the target document was acquired. Namely, in the system according to the embodiment and modifications, determination of the identity between the electronic documents in each workspace is required. Most simply, with the document ID for uniquely discriminating the electronic document being given to each electronic document, it may be determined that the electronic documents having the same document ID are the same as one another. However, the manner of determining the identity in the embodiment and modifications should not be limited to such a simple system.

For example, on the basis of one or more other attributes of each electronic document (e.g. a document ID, document name, creating date, updating data, creator, file format and data size), the identity between the electronic documents may be determined. For example, with a set of one or more attributes used for determination being regarded as one vector, if the distance between the vectors of two electronic documents is a threshold value or less, these electronic documents are regarded as the same.

Further, as the case may be, in the workspace, not only the symbol image of the electronic document itself but also that of a reference information file ("short-cut") indicative of the electronic document are arranged. In this case, the electronic document in the workspace and the reference information file designating the electronic document within another workspace may be determined as the same.

Further, by preparing a database in which a group of electronic documents explicitly regarded as the same by the user are registered, even if the document IDs do not agree with one another, it may be determined that the electronic documents registered as the same in the database may be the same.

In the embodiment and modifications described above, the distances or relevancy degrees were totaled over all the workspaces registered in the workspace DB 10 or 110. This, however, is only an example. In place of this, for example, the workspace of the user who instructed to extract any relative document may be excluded from the range for totaling. Because the user well knows the relevance between the electronic documents in his own workspace, for the purpose of hoping to know the relative document he does not know, deleting his own workspace from the range for totaling the can be considered. By referring to the user ID of each of the workspace registered in the workspace DB 10, the workspace of the user who instructed to extract any relative document can be excluded from the range for totaling.

In each of the examples described above, the information on the document group was managed in a unified way by the document group DB 11 or 125. This, however, is only an example. In place of this, each electronic document may be previously given the group attribute information indicative of the document group to which the pertinent electronic document belongs. In this case, by examining the group attribute of each electronic document, the electronic document belonging to the same group as the target document may be specified.

Further, where the electronic document can belong to a plurality of document groups, some conditions of the same group document corresponding to the target document can be considered. Under one condition, only the electronic document belonging to all the document groups to which the target document belongs is taken as the same group document. Under another condition, all the electronic documents belonging to either any one or more of the document groups to which the target document belongs are taken as the same group documents. The condition to be adopted may be registered in the same group document specifying unit 13 or 113 by e.g. the manager, or otherwise may be selectable by an individual user. Further, the screen indicative of a list of the document groups to which the target document belongs may be provided to the user and the document group to be considered in extracting the relative document may be designated from the user. In this case, the electronic document belonging to each document group designated may be taken as the same group document.

In the embodiment and modifications described above, the relevancy degree between the electronic documents was acquired on the basis of the distance between the electronic documents on the workspace. This, however, only an example. Generally, the relevancy degree between the electronic documents may be acquired on the basis of the relationship between the arranging positions of the respective electronic documents. The distance is a kind of the relationship. Further, as another example, where the position coordinates of the document information are represented by the XY coordinate system, the relevancy degree between the electronic documents may be acquired using only the one coordinate value of the X-coordinate value and Y-coordinate value. Concretely, it can be considered that two electronic documents having the position coordinates with equal X-coordinate values (even if their Y-coordinates are different) are determined to have a higher relevancy degree; but the two electronic documents having X-coordinate values different by a predetermined value or more (even if their Y-coordinates are equal) are determined to have a lower relevancy degree. In such a configuration, for example, the electronic documents residing on the same row are determined to have a higher relevancy degree. It is needless to say that without entirely disregarding the one coordinate values, in determining the relevancy degree, weights assigned to the two coordinate values may be changed. Further, for each workspace or each user of the workspace, the method for determining the relevancy degree between the electronic documents may be changed.

Figure 22:
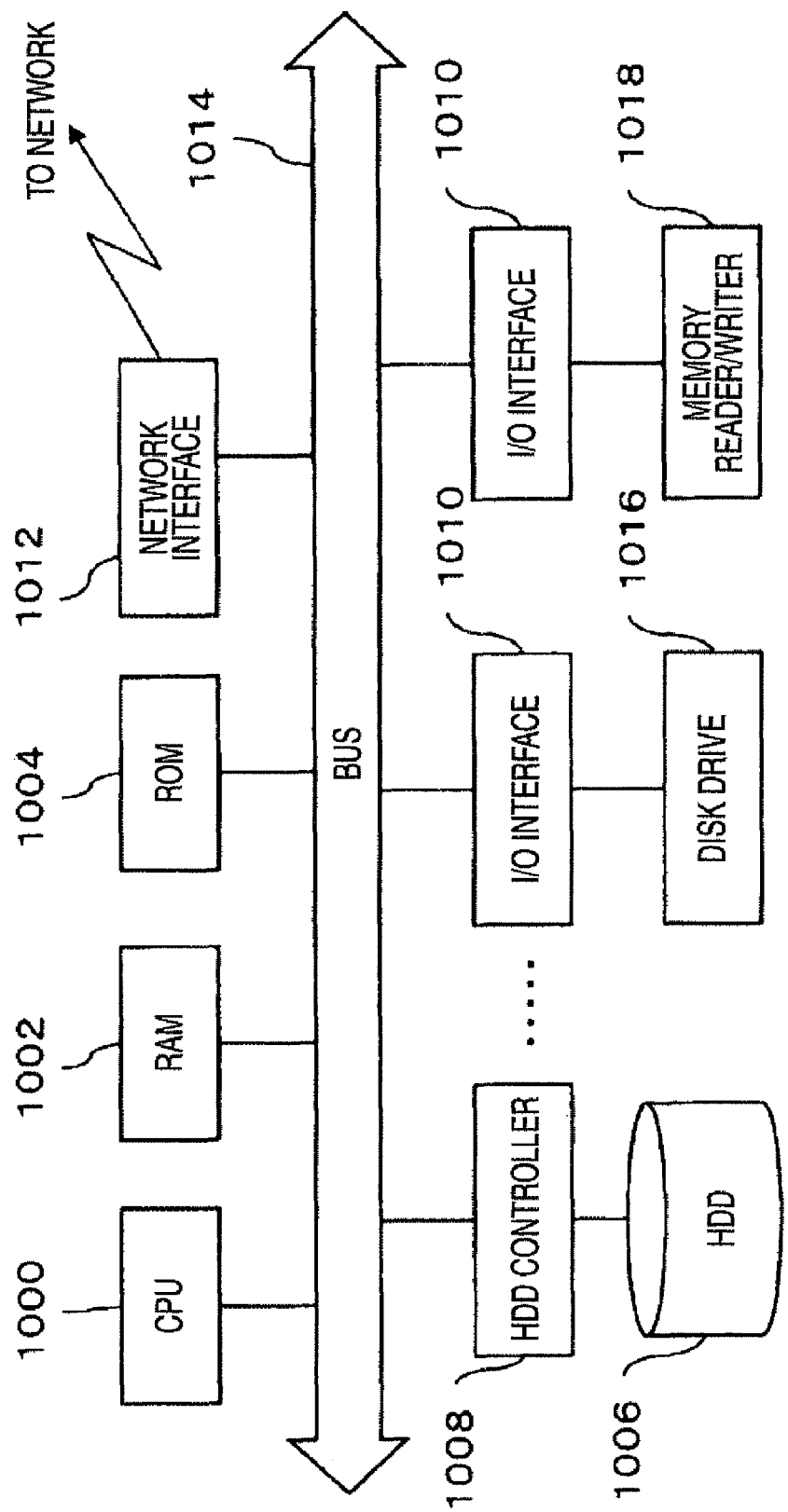
FIG. 22 is a view showing an example of the hardware configuration of a computer.

The system of the embodiment and modifications described hitherto can be realized, for example, in such a manner that a general-purpose computer is caused to execute the program representing the processing of each of the function modules described above. Now, the computer, for example, has a circuit configuration as shown in FIG. 22 as hardware in which connected via e.g. a bus 1014 are a microprocessor such as a CPU 1000, a memory (primary storage) such as a random access memory (RAM) 1002 and a read-only-memory (ROM) 1004, an HDD controller 1008 for controlling a HDD (hard disk drive) 1006, various I/O (input/output) interfaces 1010, and network interfaces 1012 for controlling the connection with the network such as a local area network. Further, may be connected to the bus 1014 e.g. via the I/O interfaces 1010 are a disk drive 1016 for read and/or write for a portable disk recording medium such as CD or DVD and a memory reader/writer 1018 for read and/or write for a portable non-volatile recording medium having various standards such as a flash memory. The program on which the processing contents of each function module illustrated above are described is held in a fixed storage device such as the hard disk drive via the recording medium such as CD or DVD or communication means such as the network, or installed in the computer. The program stored in the fixed storage device is read out to the RAM 1002 and executed by the microprocessor such as the CPU 1000. Thus, the group of function modules are realized. Additionally, a part or all of the group of function modules may be constructed as a hardware circuit such as a dedicated LSI (Large Scale Integration), ASIC (Application Specific Integrated Circuit) or FPGA (Field Programmable Gate Array).

Each function module illustrated in FIG. 1, or each function module illustrated within a document management sever 100 illustrated in FIG. 6 may be dispersively arranged in plural devices on the network to realize the function of the above system or document management server 100 while making communication to one another.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A relative document presenting system comprising:
a first storage that stores an arranging position of each of electronic documents arranged in each of a plurality of workspaces;
a second storage that stores a group to which each of the electronic documents belongs;
a relevancy degree calculating unit that, for each of the workspaces, calculates relevancy degrees between the electronic documents on the basis of the arranging position of each of the electronic documents in the workspaces stored in the first storage;
a receiving unit that receives designation of a target electronic document from a user;
a specifying unit that specifies an electronic document belonging to the same group as the target document designated by the user on the basis of the second storage;
a totaling unit that, for each of the electronic documents, totals relevancy degrees between each of the electronic documents and the target electronic document and relevancy degrees between each of the electronic documents and the electronic document specified by the specifying unit in each of the workspace;
a presenting unit that presents an electronic document related to the target electronic document among the electronic documents on the basis of a totaling result obtained by the totaling unit; and
a correcting unit that, in a case where the target electronic document and the electronic document specified by the specifying unit are arranged in the same workspace, corrects the relevancy degrees between each of the electronic documents and the electronic document specified by the specifying unit in each of the workspaces on the basis of a position relationship between an arranging position of the target electronic document and an arranging position of the electronic document specified by the specifying unit in the workspaces, wherein the totaling unit totals the relevancy degree corrected by the correcting unit.

2. The relative document presenting system as claimed in claim 1, wherein the totaling unit, in a case where a group of electronic documents within workspaces are subjected to predetermined line-up processing, excludes the relevancy degrees between the electronic documents in the workspaces from an object for totaling.

3. A relative document presenting system comprising:

a first storage that stores an arranging position of each of electronic documents arranged in each of a plurality of workspaces;

a second storage that stores a group to which each of the electronic documents belongs;

a relevancy degree calculating unit that, for each of the workspaces, calculates relevancy degrees between the electronic documents on the basis of the arranging position of each of the electronic documents in the workspaces stored in the first storage;

a receiving unit that receives designation of a target electronic document from a user;

a specifying unit that specifies an electronic document belonging to the same group as the target document designated by the user on the basis of the second storage;

a totaling unit that, for each of the electronic documents, totals relevancy degrees between each of the electronic documents and the target electronic document and relevancy degrees between each of the electronic documents and the electronic document specified by the specifying unit in each of the workspace;

a presenting unit that presents an electronic document related to the target electronic document among the electronic documents on the basis of a totaling result obtained by the totaling unit; and an acquiring unit that acquires number of the electronic document specified by the specifying unit on the basis of the first storage, and that converts the acquired number into a reliable degree on the basis of a predetermined conversion information, wherein the presenting unit presents the information indicating the related electronic document related to the target electronic document, correlated with the reliable degree.

4. A relative document presenting system comprising:

a first storage that stores an arranging position of each of electronic documents arranged in each of a plurality of workspaces;

a second storage that stores a group to which each of the electronic documents belongs:

a relevancy degree calculating unit that, for each of the workspaces, calculates relevance degrees between the electronic documents on the basis of the arranging position of each of the electronic documents in the workspaces stored in the first storage;

a receiving unit that receives designation of a target electronic document from a user;

a specifying unit that specifies an electronic document belonging to the same group as the target document designated by the user on the basis of the second storage;

a totaling unit that, for each of the electronic documents, totals relevancy degrees between each of the electronic documents and the target electronic document and relevancy degrees between each of the electronic documents and the electronic document specified by the specifying unit in each of the workspace;

a presenting unit that presents an electronic document related to the target electronic document among the electronic documents on the basis of a totaling result obtained by the totaling unit;

a third storage that stores users corresponding to the workspaces and determination information for determining an intensity of relevancy between the users; and a determining unit that, on the basis of the determination information, determines the intensity of relevancy between a first user who designates the target electronic document for the receiving unit and a second user corresponding to a workspace on which each of the electronic documents is arranged, wherein the collecting unit corrects the relevancy degrees between each of the electronic documents and the target electronic document and the relevancy degrees between each of the electronic documents and the electronic document specified by the specifying unit in each of the workspaces, and totals the corrected relevancy degrees, respectively.

5. A relative document presenting method comprising:

storing an arranging position of each of electronic documents arranged in each of a plurality of workspaces;

storing a group to which each of the electronic documents belongs;

calculating, for each of the workspaces, the relevancy degrees between the electronic documents on the basis of the arranging position of each of the electronic documents in the workspaces stored in the first storage;

receiving designation of a target electronic document from a user;

specifying an electronic document belonging to the same group as the target document designated by the user;

totaling, for each of the electronic documents, relevancy degrees between each of the electronic documents and the target electronic document and relevancy degrees between each of the electronic documents and the electronic document specified by the specifying unit in each of the workspace:

presenting an electronic document related to the target electronic document among the electronic documents on the basis of a totaling result obtained in the totaling of the relevancy degree; and correcting, in a case where the target electronic document and the electronic document specified are arranged in the same workspace, the relevancy degrees between each of the electronic documents and the electronic document specified in each of the workspaces on the basis of a position relationship between an arranging position of the target electronic document and an arranging position of the electronic document specified in the workspaces, wherein the totaling totals the relevancy degree corrected.

6. A non-transitory computer readable recording medium storing a program causing a computer to execute a process for presenting a relevant document, the process comprising:

storing an arranging position of each of electronic documents arranged in each of a plurality of workspaces;

storing a group to which each of the electronic documents belongs;

calculating, for each of the workspaces, the relevancy degrees between the electronic documents on the basis of the arranging position of each of the electronic documents in the workspaces stored in the first storage;

receiving designation of a target electronic document from a user;

specifying an electronic document belonging to the same group as the target document designated by the user;

totaling, for each of the electronic documents, relevancy degrees between each of the electronic documents and the target electronic document and relevancy degrees between each of the electronic documents and the electronic document specified by the specifying unit in each of the workspaces;

presenting an electronic document related to the target electronic document among the electronic documents on the basis of a totaling result obtained in the totaling of the relevancy degrees; and correcting, in a case where the target electronic document and the electronic document specified are arranged in the same workspace, the relevancy degrees between each of the electronic documents and the electronic document specified in each of the workspaces on the basis of a position relationship between an arranging position of the target electronic document and an arranging position of the electronic document specified in the workspaces, wherein the totaling totals the relevancy degree corrected.

* * * * *